United States Patent
Gross et al.

(10) Patent No.: US 8,072,957 B2
(45) Date of Patent: Dec. 6, 2011

(54) SYSTEM AND METHOD FOR INCORPORATING DYNAMIC ORTHOGONAL FREQUENCY-DIVISION MULTIPLEXING INTO WIRELESS NETWORK PROTOCOLS

(75) Inventors: James Richard Gross, Aachen (DE); Marc P. Emmelmann, Berlin (DE)

(73) Assignee: Proximetry, Inc., San Diego, CA (US)

( * ) Notice: Subject to any disclaimer, the term of this patent is extended or adjusted under 35 U.S.C. 154(b) by 770 days.

(21) Appl. No.: 12/016,586

(22) Filed: Jan. 18, 2008

(65) Prior Publication Data

US 2008/0232490 A1    Sep. 25, 2008

Related U.S. Application Data

(60) Provisional application No. 60/881,132, filed on Jan. 18, 2007.

(51) Int. Cl.
| | |
|---|---|
| H04B 7/216 | (2006.01) |
| H04L 27/28 | (2006.01) |
| H04W 4/00 | (2009.01) |

(52) U.S. Cl. ...... 370/342; 370/335; 375/260; 455/422.1
(58) Field of Classification Search .................. 370/335, 370/338, 342; 375/260–262
See application file for complete search history.

(56) References Cited

U.S. PATENT DOCUMENTS

| | | | |
|---|---|---|---|
| 6,473,418 B1 | 10/2002 | Laroia | |
| 7,012,912 B2 | 3/2006 | Naguib | |
| 7,103,112 B2 | 9/2006 | Webster et al. | |
| 7,286,609 B2 | 10/2007 | Maltsev | |
| 7,307,953 B2 | 12/2007 | Zhang | |
| 7,352,819 B2 | 4/2008 | Lakshmipathi | |
| 7,412,242 B2 | 8/2008 | Cho | |
| 7,453,966 B2 | 11/2008 | Tang | |
| 7,564,813 B2 | 7/2009 | Lee | |
| 7,567,625 B2 | 7/2009 | Oh | |
| 7,623,588 B2 | 11/2009 | Park | |
| 7,756,521 B2 | 7/2010 | Gerlach | |
| 7,843,802 B2 | 11/2010 | Yue | |
| 7,852,953 B2 | 12/2010 | Lozano | |
| 7,933,244 B2 | 4/2011 | Li | |
| 7,965,649 B2 | 6/2011 | Tee | |
| 2004/0141522 A1* | 7/2004 | Texerman et al. | 370/466 |
| 2005/0047384 A1* | 3/2005 | Wax et al. | 370/338 |

(Continued)

FOREIGN PATENT DOCUMENTS

EP    1737176    12/2006

(Continued)

OTHER PUBLICATIONS

PCT/US08/51428—International Search Report Mailed May 20, 2008.

*Primary Examiner* — Thai Hoang
(74) *Attorney, Agent, or Firm* — Letham Law Firm LLC; Lawrence Letham

(57) ABSTRACT

A method for incorporating dynamic orthogonal frequency-division multiplexing ("OFDM") in wireless networks is provided. Information about a wireless channel between a transmitter and one or more receivers communicating according to a wireless protocol is acquired. Dynamic OFDM allocations are generated based on the acquired information about the wireless channel. The dynamic OFDM allocations are transmitted to the one or more receivers according to the wireless protocol.

43 Claims, 20 Drawing Sheets

U.S. PATENT DOCUMENTS

| | | |
|---|---|---|
| 2005/0047517 A1 | 3/2005 | Georgios |
| 2005/0135318 A1* | 6/2005 | Walton et al. ............... 370/338 |
| 2005/0141545 A1* | 6/2005 | Fein et al. ................... 370/445 |
| 2006/0045117 A1* | 3/2006 | Qi et al. ...................... 370/445 |
| 2006/0078059 A1 | 4/2006 | Ok |
| 2006/0159003 A1* | 7/2006 | Nanda et al. ............... 370/203 |
| 2006/0209749 A1 | 9/2006 | Blanz et al. |
| 2006/0240780 A1 | 10/2006 | Zhu et al. |
| 2007/0167140 A1* | 7/2007 | Grandhi et al. ............. 455/88 |
| 2008/0232340 A1 | 9/2008 | Wan |
| 2009/0003468 A1 | 1/2009 | Karabulut |
| 2009/0161783 A1 | 6/2009 | Ozluturk |
| 2009/0190537 A1 | 7/2009 | Hwang |
| 2009/0232074 A1 | 9/2009 | Yang |
| 2009/0310692 A1 | 12/2009 | Kafle |
| 2010/0150088 A1 | 6/2010 | Dos Santos |

FOREIGN PATENT DOCUMENTS

| | | |
|---|---|---|
| EP | 1793507 | 10/2009 |
| WO | WO0223847 | 3/2002 |
| WO | WO2006093468 | 9/2006 |
| WO | WO2007041521 | 4/2007 |
| WO | WO2007055652 | 8/2007 |

* cited by examiner

SYSTEM AND METHOD FOR INCORPORATING DYNAMIC ORTHOGONAL FREQUENCY-DIVISION MULTIPLEXING INTO WIRELESS NETWORK PROTOCOLS

CROSS-REFERENCE TO RELATED APPLICATIONS

This application claims priority to U.S. Provisional Application No. 60/881,132, filed Jan. 18, 2007, entitled "Dynamic OFDMA Schemes in IEEE 802.11 Systems", which is incorporated herein by reference in its entirety.

BRIEF DESCRIPTION OF THE INVENTION

This invention relates generally to dynamic orthogonal frequency-division multiplexing techniques for use in wireless networks. More particularly, this invention relates to incorporating dynamic orthogonal frequency-division multiplexing techniques in wireless networks protocols while supporting full backward compatibility with the protocols.

BACKGROUND OF THE INVENTION

Wireless local area networks ("WLANs") provide wireless access to network resources within a given coverage area. Users may connect to WLANs using any wireless-enabled device, such as computer desktops and laptops, personal digital assistants ("PDAs"), telephones, digital music players, game consoles, and other portable devices, providing virtually unlimited access to users. Because of their relatively low cost, ease of use, and the mobility that they provide, WLANs have become the preferred technology of choice for network access in homes, offices, and designated areas in airports, meeting rooms, coffee shops, and the like.

Most WLANs available today are governed by wireless protocols that establish the rules for coding, authentication and error detection required to send information over a wireless channel. These wireless protocols include, for example, the IEEE 802.11 family of protocols (e.g., 802.11a/b/g/) that have become ubiquitous across the WLAN market. The common set of protocols enables WLAN equipment to be highly interoperable, thereby providing increased flexibility and connectivity to users.

In the current implementations of IEEE 802.11a/g, for example, data rates of up to 54 Mbps are achievable by employing orthogonal frequency-division multiplexing ("OFDM") as their modulation scheme. OFDM works by splitting the wireless channel into multiple sub-channels and representing them with orthogonal sub-carriers that are each individually modulated. As a result, information may be divided into multiple symbols that are transmitted in parallel through the sub-channels rather than sequentially through one (very broad) channel. This leads to much longer symbol durations, such that the impact of inter-symbol interference is significantly reduced. With less symbols colliding, there is almost no need for additional measures like costly equalization.

Today OFDM is used as the foundation for several standards, including the digital video broadcasting ("DVB") standard and the WiMax wireless networking standard, while it is a strong candidate for several upcoming standards, such as for high-rate extensions to third-generation communication systems as well as for fourth-generation mobile communication systems. OFDM is also likely to remain the basis for future extensions of the IEEE 802.11 standards, including the IEEE 802.11n proposal for improved system performance.

The IEEE 802.11 architecture consists of two basic components: mobile stations ("STAs")—frequently called terminals—and access points ("APs"). Terminals may communicate directly with each other in an "ad-hoc mode" forming an independent basic service set or indirectly via an AP forming an infrastructure basic service set ("BSS"). Several BSSs may be connected via a distribution system ("DS") forming an extended service set ("ESS"). FIG. 1 illustrates the IEEE 802.11 architecture 100 in infrastructure mode.

The IEEE 802.11 protocols are based on a Medium Access Control ("MAC") sub-layer, MAC management protocols and services, and several physical layers ("PHY"). A medium access scheme referred to as the Distribution Control Function ("DCF") employs Carrier Sense Multiple Access with Collision Avoidance ("CSMA/CA") and binary exponential back-off. STAs refrain from transmitting if they detect the wireless channel or medium ("WM") occupied.

In addition to this physical carrier sensing, the IEEE 802.11 protocols introduce a virtual carrier sensing mechanism: the network allocation vector ("NAV"). The NAV is a time period in which the WM must be treated as busy even if the physical carrier sensing does not indicate this situation. Stations are not, however, allowed to start transmitting immediately after they discover the WM idle after the NAV time period. They have to sense the WM idle for a deterministic time—the so-called Inter-Frame Space ("IFS")—before starting their transmission. The length of this interval allows granting prioritized medium access for certain transmissions. The smallest interval is called short IFS ("SIFS"), which is specified for each physical layer.

A two-way handshake between transmitter and receiver preceding the transmission of a data frame may be used to exclusively reserve the WM and set the NAV long enough to complete the desired transmission. This two-way handshake is achieved with a Request to Send/Clear to Send ("RTS/CTS") frame exchange. The RTS/CTS frame exchange is not mandatory but most commonly used by default if the length of a data packet exceeds a given threshold.

Data packets transmitted according to the IEEE 802.11 protocols are encapsulated in a Physical Layer Protocol Data Unit ("PPDU") depicted in FIG. 2. The PPDU 200 includes a header 205, referred to as the Physical Layer Convergence Protocol ("PLCP") header, following a PLCP initial preamble 210. The coded data is encoded in packets in a PLCP service data unit 215, referred to as "PSDU". Most of the PLCP header constitutes a separate single OFDM symbol 220, denoted SIGNAL, that is transmitted with the most robust combination of BPSK modulation and a convolutional coding rate of R=½. The SERVICE field 225 of the PLCP header 205 together with PSDU 215 form a unit denoted as DATA 230. DATA 230 is transmitted at the data rate described in the RATE field 235 of PCLP header 205 and may constitute multiple OFDM symbols.

The OFDM modulation scheme employs a total bandwidth of 16.25 MHz. This bandwidth is split into 52 sub-carriers, from which 4 sub-carriers are used exclusively as pilots. Therefore, 48 sub-carriers of bandwidth 312.5 MHz each are utilized for data transmission. The data is first convolutionally encoded. The resulting data block is transmitted via all 48 sub-carriers employing the same modulation type. Four modulation types are available for modulating the sub-carriers: BPSK, QPSK, 16-QAM and 64-QAM. The choice of the coding/modulation combination is crucial for the performance of a WLAN, i.e., its throughput, power consumption, error behavior, and so on.

The performance of a WLAN can be increased dramatically by dynamically adapting some or all of the OFDM parameters. Dynamic OFDM, as it is commonly referred, encompasses a family of approaches in which the transmitter adaptively controls the modulation type, the transmit power and/or the coding scheme applied on a per packet and/or per sub-carrier basis, in order to adjust itself in a best possible way to the actual values of the sub-carrier gains.

Dynamic OFDM is based on the observation that the gains of individual sub-carriers vary in time and are also frequency-dependent. Previous work has clearly demonstrated that the performance in terms of throughput, power consumption, error behavior, etc., of an OFDM-based WLAN can be significantly improved by adapting the transmit power and/or modulation type to the current gain of each sub-carrier.

Several different dynamic OFDM strategies can be applied, such as, for example, bit loading and adaptive modulation. Bit loading refers to the case where the transmitter maximizes the sum data rate over all sub-carriers by varying the transmit power and modulation type per sub-carrier. A somewhat simpler scheme to apply is adaptive modulation, in which the transmitter assigns each sub-carrier the same transmit power.

In contrast to these and other dynamic OFDM strategies, current IEEE 802.11-based WLANs may only apply link adaptation, in which the same transmit power and modulation type is applied to all sub-carriers, regardless of their individual gains. Previous work has shown that optimal link adaptation schemes have significantly lower performance than dynamic OFDM schemes that adapt the transmit power and/or the modulation type per sub-carrier.

Such dynamic OFDM schemes, however, have not yet been integrated into WLAN protocols, including the IEEE 802.11 protocols. The performance gain of these dynamic OFDM schemes come at such a system-wide cost that such schemes have not been adopted by the wireless protocols. For example, the transmitter must first be able to accurately estimate the sub-carrier gains before adapting the transmit power and/or modulation type per sub-carrier based on their gains. To do so, the transmitter must know the current state of the wireless channel, which consumes system resources such as time, power, and bandwidth.

Computational resources are also required at the transmitter to generate the dynamic OFDM allocations of transmit power and/or modulation type per sub-carrier. The transmitter has to be equipped with enough computational resources such that the generation time of the dynamic OFDM allocations is sufficiently smaller than the time span during which sub-carrier attenuations change significantly. In addition, the receiver has to be informed of all the transmit power and/or modulation type allocations per sub-carrier, otherwise it cannot decode the data correctly.

SUMMARY OF THE INVENTION

In one aspect the invention relates to a method for incorporating dynamic orthogonal frequency-division multiplexing ("OFDM") in wireless networks. Information is acquired about a wireless channel between a transmitter and one or more receivers communicating according to a wireless protocol. Dynamic OFDM allocations based on the acquired information about the wireless channel are generated. The dynamic OFDM allocations are then transmitted to the one or more receivers according to the wireless protocol.

The invention also pertains to a computer readable storage medium with executable instructions to establish a control handshake between a transmitter and one or more receivers communicating according to a wireless protocol governing communications across a wireless channel. Information is acquired about the wireless channel based on the control handshake. Dynamic orthogonal frequency-division ("OFDM") data is generated based on the acquired information. The dynamic OFDM data is then transmitted to the one or more receivers.

The invention is further directed to a transmitter for transmitting dynamic orthogonal frequency-division multiplexing ("OFDM") data to one or more receivers communicating according to a wireless protocol across a wireless channel. The transmitter includes a module for acquiring information about the wireless channel based on a control handshake between the transmitter and the one or more receivers. A module generates dynamic OFDM allocations based on the acquired information. A module codes data according to the dynamic OFDM allocations. A module packages the dynamic OFDM allocations and the coded data in a data frame based on the wireless protocol.

The invention is also directed to a receiver for receiving dynamic orthogonal frequency-division multiplexing ("OFDM") data from a transmitter communicating according to a wireless protocol across a wireless channel. The receiver includes a module for decoding a header based on the wireless protocol to extract dynamic OFDM allocations. A module decodes a data frame based on the wireless protocol to extract data coded according to the dynamic OFDM allocations.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

Figure 1:
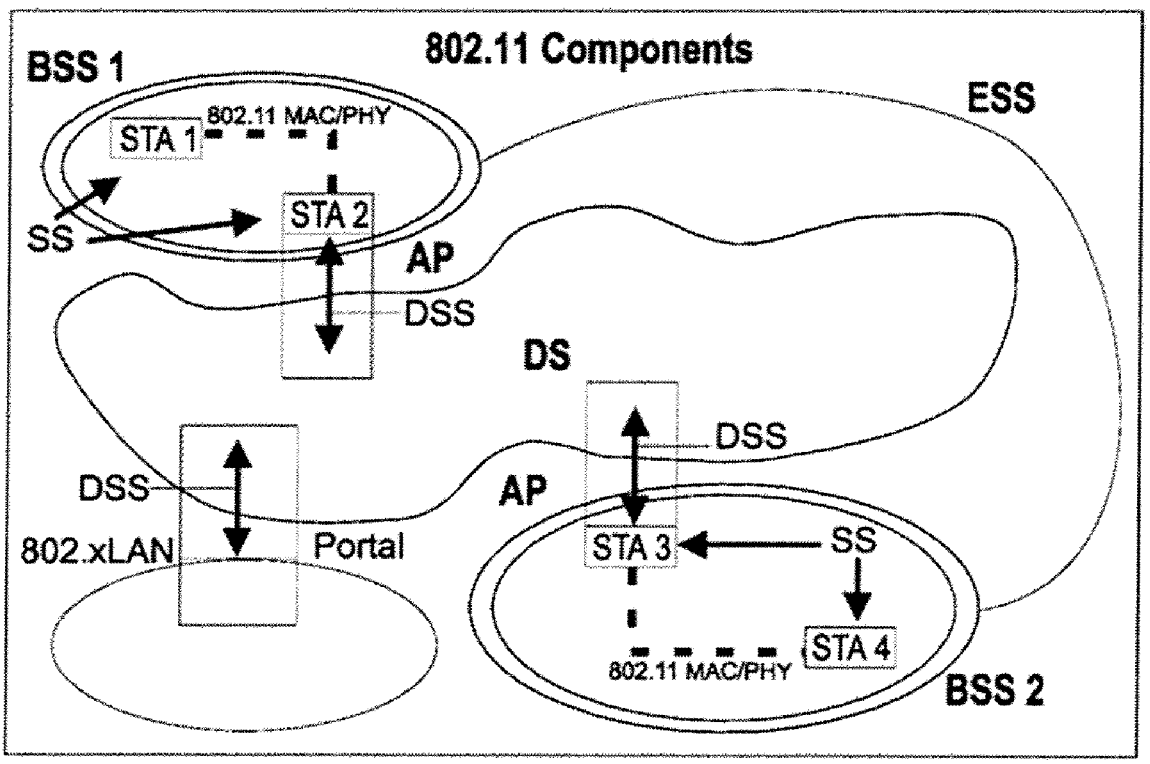
FIG. 1 illustrates a prior art architecture of the IEEE 802.11 family of protocols in the infrastructure mode.

In various aspects the present invention provides a system, method, and computer readable storage medium for incorporating dynamic orthogonal frequency-division multiplexing ("OFDM") into wireless network ("WLAN") protocols. As generally used herein, a WLAN refers to a network providing wireless access to network resources within a given coverage area. WLAN protocols are protocols that establish the rules for coding, authentication and error detection required to send information over a wireless channel. Examples of WLAN protocols include, but are not limited to, the IEEE 802.11 family of protocols, such as the protocols incorporated in the currently-available IEEE standards 802.11a, 802.11b, and 802.11g, and the protocols under proposal for the IEEE 802.11n standard, the HiperLAN family of protocols, and the WiMax protocol.

According to an embodiment of the invention, dynamic OFDM is incorporated into OFDM-based WLAN protocols while providing full backward compatibility with the protocols. Dynamic OFDM, as generally used herein, refers to OFDM techniques in which the transmitter adaptively controls the modulation type, the transmit power and/or the coding scheme applied on a per packet and/or per sub-carrier basis, in order to adjust itself in a best possible way to the actual values of the sub-carrier gains.

In one embodiment, both the transmit power and the modulation type assigned to each sub-carrier may be varied by having a transmitter within the WLAN maximize the total data rate over all sub-carriers (i.e., bit loading). In another embodiment, the transmitter may assign each sub-carrier the same transmit power. Together with the channel gain, this results in a specific signal-to-noise ratio ("SNR") value per sub-carrier. Given this SNR value per sub-carrier and the target bit-error rate ("BER"), the transmitter applies the best modulation type with respect to the target BER to each sub-carrier (i.e., adaptive modulation).

According to an embodiment of the invention, two dynamic OFDM modes are incorporated into WLAN protocols: (1) a point-to-point mode; and (2) a point-to-multipoint mode. In the point-to-point mode, dynamic OFDM communications are supported for a transmitter communicating directly with a single receiver. This mode can be used, for example, by stations transmitting to the access point ("AP"). It features individual transmit power and/or modulation type adaptation per sub-carrier, leading to a much higher throughout.

In the point-to-multipoint mode, dynamic OFDM communications are supported between a transmitter communicating with two or more receivers. This mode may be used, for example, by the AP to communicate in parallel with different stations. In this case, the AP generates disjoint sub-carrier subsets, which are assigned to each station, in addition to individual transmit power and/or modulation type allocations per sub-carrier. This mode exploits multi-user diversity by assigning different sets of sub-carriers to different stations. Applying this mode allows for both multi-user and frequency diversity to significantly outperform currently-available OFDM-based WLAN protocols.

Dynamic OFDM may be implemented in both the point-to-point and the point-to-multipoint modes by having a transmitter within the WLAN perform, for example, three functions: (1) acquire information about the wireless channel to identify the sub-carrier gains; (2) generate dynamic OFDM allocations based on the acquired information; and (3) transmit the dynamic OFDM allocations to one (i.e., in the point-to-point mode) or more (i.e., in the point-to-multipoint mode) receivers.

According to an embodiment of the invention, these functions are satisfied by a transmitter communicating with one or more receivers according to OFDM-based WLAN protocols, such as the IEEE 802.11a/g protocols. The first function, i.e., that of acquiring wireless channel information, is achieved by establishing a control handshake between the transmitter and the one or more receivers. The control handshake is implemented with an RTS/CTS frame exchange(s) between the transmitter and the one or more receivers. The second function, i.e., that of generating dynamic OFDM allocations based on the acquired information, is achieved by applying either bit loading or adaptive modulation strategies. And, lastly, the third function, i.e., that of transmitting the dynamic OFDM allocations to the one or more receivers, is achieved by modifying the physical layer header to convey the allocations to the one or more receivers while maintaining backward compatibility with the traditional OFDM-based WLAN protocols.

Figure 3:
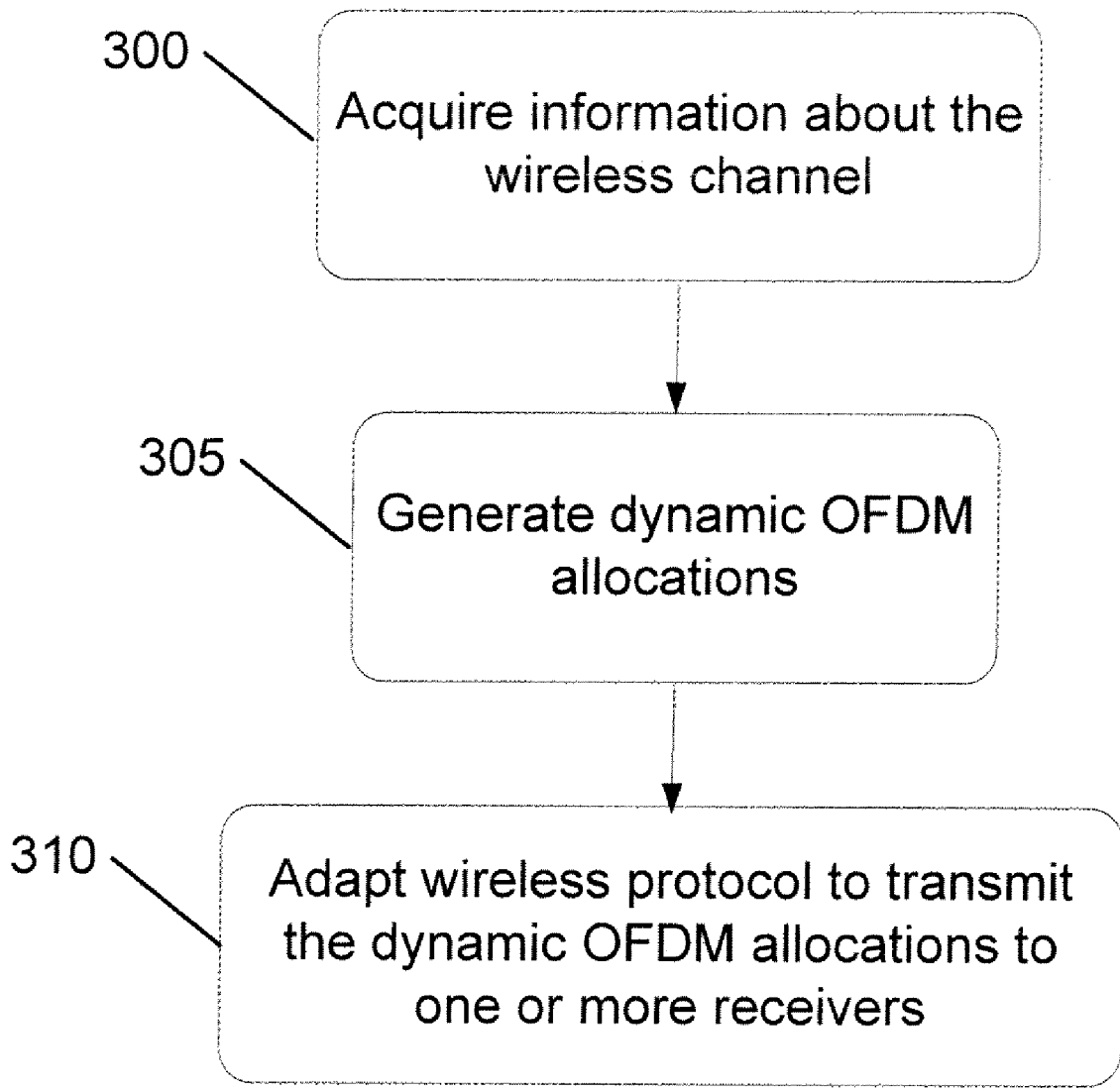
FIG. 3 illustrates a flow chart for incorporating dynamic OFDM into a WLAN protocol in accordance with an embodiment of the invention.

FIG. 3 illustrates a flow chart for incorporating dynamic OFDM into a WLAN protocol in accordance with an embodiment of the invention. First, information is acquired about a wireless channel between a transmitter and one or more receivers communicating according to a WLAN protocol, such as the OFDM-based IEEE 802.11a/g protocols (300). As described in more detail herein below, the information is acquired by establishing a control handshake via an RTS/CTS frame exchange(s) between the transmitter and the one or more receivers.

Next, dynamic OFDM allocations for transmit power and/or modulation type per sub-carrier are generated based on the acquired information about the wireless channel (305). The dynamic OFDM allocations may be generated either by applying bit loading or adaptive modulation strategies. As described in more detail herein below, the dynamic OFDM allocations are generated by managing the time required to complete a desired transmission, such as, for example, by appropriately setting the network allocation vector ("NAV") specified in the IEEE 802.11 protocols.

Lastly, the wireless protocol is adapted to transmit the dynamic OFDM allocations over the wireless channel to the one or more receivers (310). As described in more detail herein below, this is accomplished by modifying a physical layer header, such as the PLCP header 205 specified in the IEEE 802.11 protocols, to indicate the allocations to the one or more receivers. The dynamic OFDM allocations are used to code the packets in PSDU 215 transmitted to the one or more receivers following the PLCP header 205.

It is appreciated by one of ordinary skill in the art that the steps illustrated in FIG. 3 may be applied to any currently-available WLAN protocol, such as the IEEE 802.11 protocols. It is also appreciated that the steps illustrated in FIG. 3 may be applied to WLAN protocols while supporting full backward compatibility with the protocols.

Figure 4:
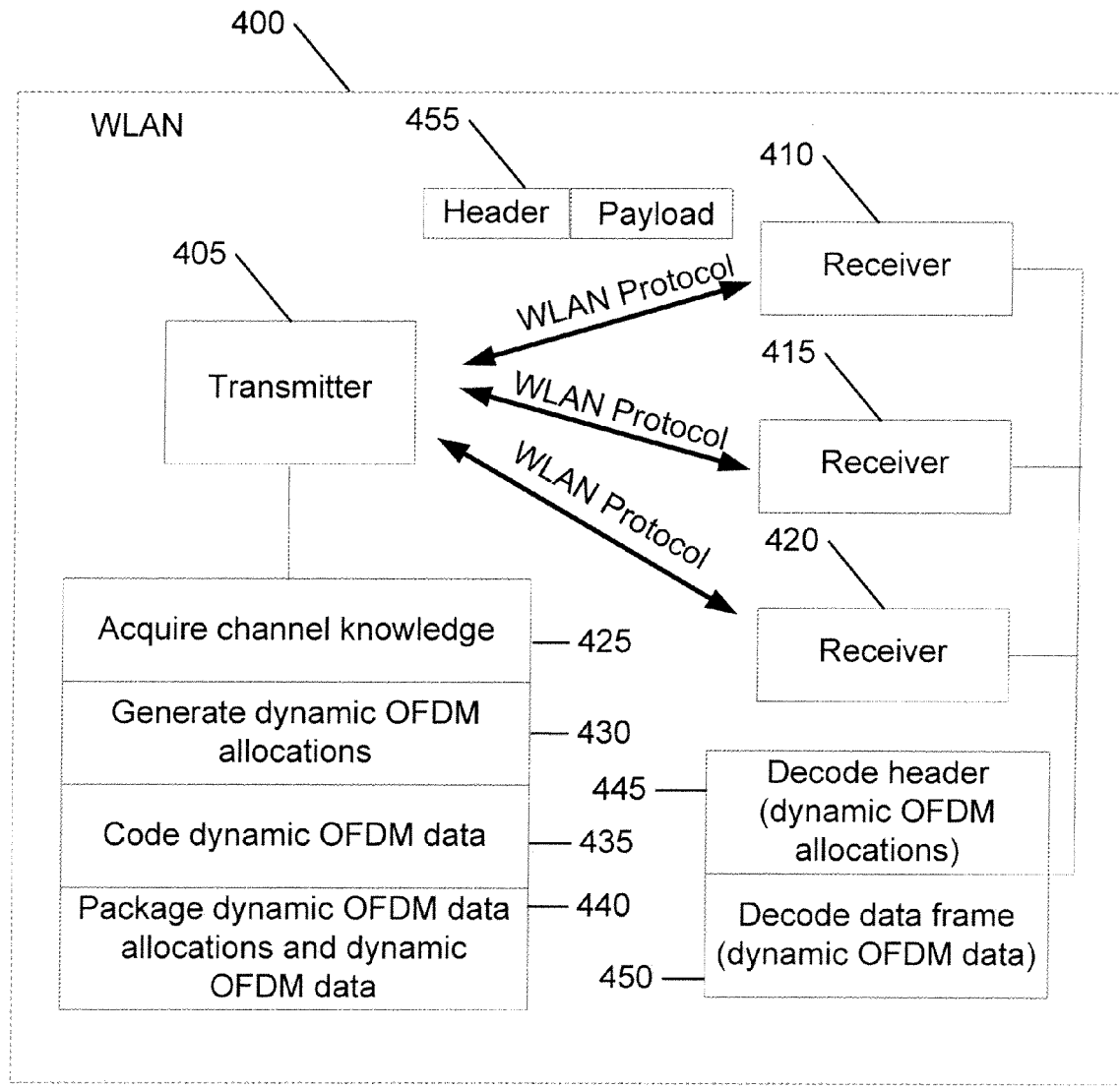
FIG. 4 illustrates an exemplary environment of a WLAN supporting dynamic OFDM communications in accordance with an embodiment of the invention.

FIG. 4 illustrates an exemplary environment of a WLAN supporting dynamic OFDM communications in accordance with an embodiment of the invention. WLAN 400 has at least one transmitter 405 communicating with one or more receivers, such as receivers 410-420. The communications taking place within WLAN 400 are governed by a wireless protocol supporting dynamic OFDM, as described in more detail herein below.

Transmitter 405 is equipped with modules 425-440 for acquiring information about the wireless channel (425), generating dynamic OFDM allocations based on the acquired information (430), coding data according to the dynamic OFDM allocations (435), and packaging the dynamic OFDM allocations and the dynamic OFDM data for transmission to the one or more receivers (440), such as receivers 410-420. Conversely, receivers 410-420 are equipped with modules 445-450 for decoding a header based on the wireless protocol to extract the dynamic OFDM allocations (445) and for decoding a data frame based on the wireless protocol to extract the coded dynamic OFDM data (450).

The dynamic OFDM allocations and the dynamic OFDM data may be packaged together in a frame, such as frame 455, having both a header and a payload. In one embodiment, the header of the WLAN protocol used in WLAN 400 is modified to include the dynamic OFDM allocations. The dynamic OFDM data is packaged in the payload as specified in the WLAN protocol.

It is appreciated that transmitter 405 may be a station communicating with an AP (receiver) or vice-versa, that is, transmitter 405 may be an AP communicating with stations (receivers). It is also appreciated that transmitter 405 may have additional modules for implementing the WLAN protocol, such as the IEEE 802.11 protocol.

Point-to-Point Mode

Figure 5:
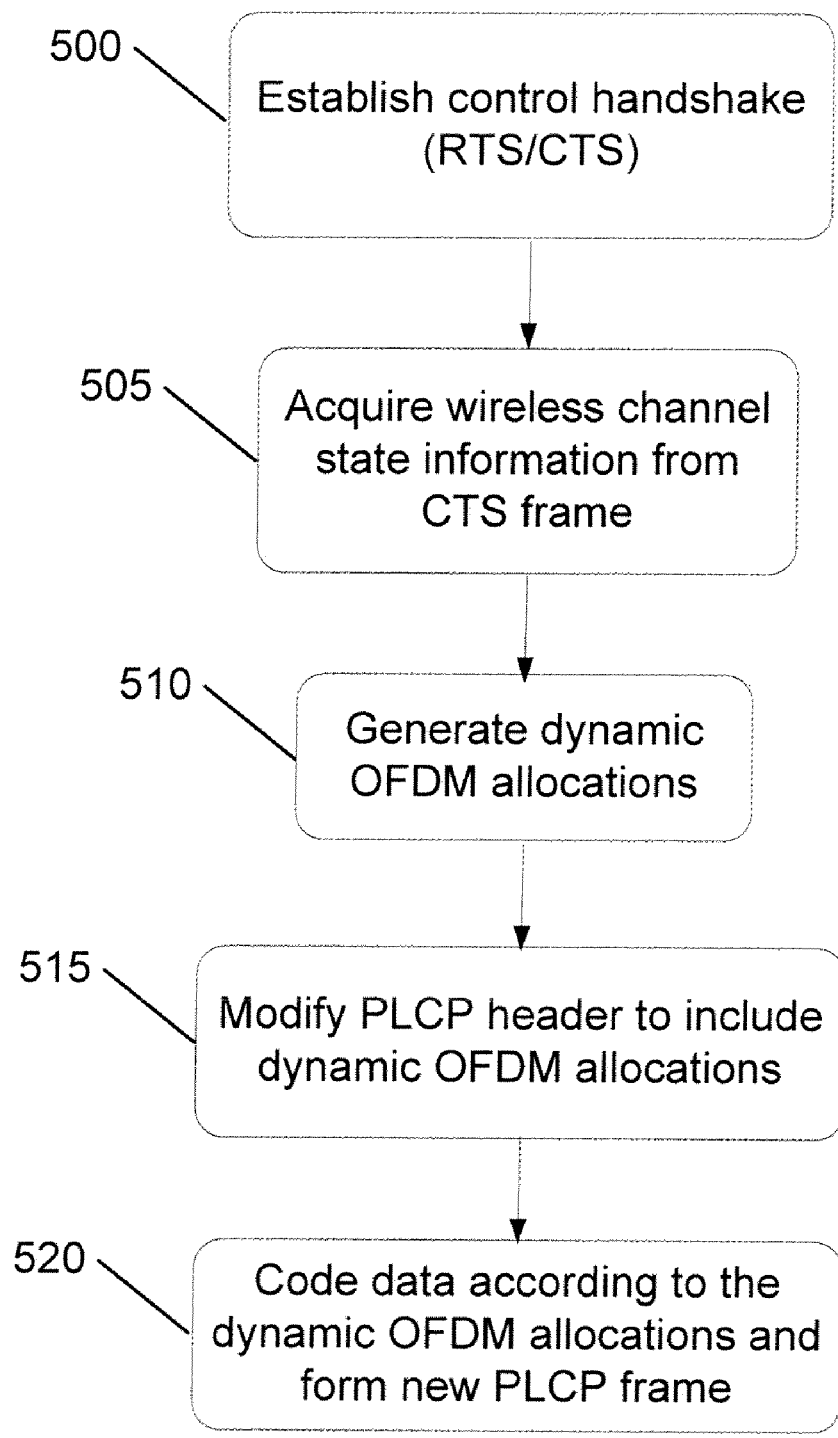
FIG. 5 illustrates a flow chart for incorporating dynamic OFDM in a point-to-point mode of a WLAN protocol in accordance with an embodiment of the invention.

FIG. 5 illustrates a flow chart for incorporating dynamic OFDM in a point-to-point mode of a WLAN protocol in accordance with an embodiment of the invention. First, a control handshake is established between a transmitter and a receiver within the WLAN (500). In one embodiment, the control handshake may be, for example, an RTS/CTS frame exchange between the transmitter and the receiver that occurs before every dynamic OFDM transmission.

According to this embodiment, the transmitter transmits an RTS frame to the receiver as specified in the WLAN protocol, e.g., the IEEE 802.11 protocols. After the duration of a SIFS, i.e., 16 µs, the receiver responds with a CTS frame, also transmitted in accordance to the WLAN protocol. By receiving the CTS frame, the transmitter can acquire the desired information about the wireless channel and estimate the state of the channel based on the PLCP preamble of the received CTS frame (505). This is possible as the wireless channel has been shown to be reciprocal, i.e., the channel gain from the transmitter to the receiver is equivalent to the one from the receiver to the transmitter. Accordingly, the transmitter has to decide about usage/non-usage of dynamic OFDM on a per packet basis.

Based on the channel state information obtained from the CTS frame (specifically from the preamble of the CTS frame), the transmitter generates the appropriate dynamic OFDM allocations per sub-carrier (510). The dynamic OFDM allocations are generated for the transmit power and/or modulation type per sub-carrier either by applying bit loading or by applying adaptive modulation.

It is appreciated that the dynamic OFDM allocations may be generated with any algorithm known by one of ordinary skill in the art. For example, the dynamic OFDM allocations may be generated with any one of the algorithms described in M. Bohge, J. Gross, M. Meyer, and A. Wolisz, "Dynamic Resource Allocation in OFDM Systems: An Overview of Cross-Layer Optimization Principles and Techniques", IEEE Network Magazine, Special Issue: "Evolution toward 4G wireless networking", vol. 21, no. 1, pp. 53-59, January/February 2007.

It is appreciated that once the PLCP preamble of the CTS frame is received, the transmitter has to generate the dynamic OFDM allocations together with the new PLCP header within a certain time span, for example, 36 µs for the IEEE 802.11a protocol (the remaining CLS frame requires 20 µs, followed by a SIFS, which has a duration of 16 µs). If the generation of the dynamic OFDM allocations requires more than this time span, other stations may start acquiring the WM as they believe it is idle. If this is the case, a busy tone may be used to prevent the other stations from accessing the WM.

In order to transmit the dynamic OFDM allocations to the receiver, the transmitter modifies the physical layer header of the WLAN protocol (515). For example, the transmitter modifies the PLCP header of the IEEE 802.11 protocols, to include the dynamic OFDM allocations in the header. Lastly, the transmitter codes the data in a PSDU according to the dynamic OFDM allocations and forms a new PLCP frame (520). The new PLCP frame is transmitted to the receiver in accordance to the WLAN protocol.

Figure 2:
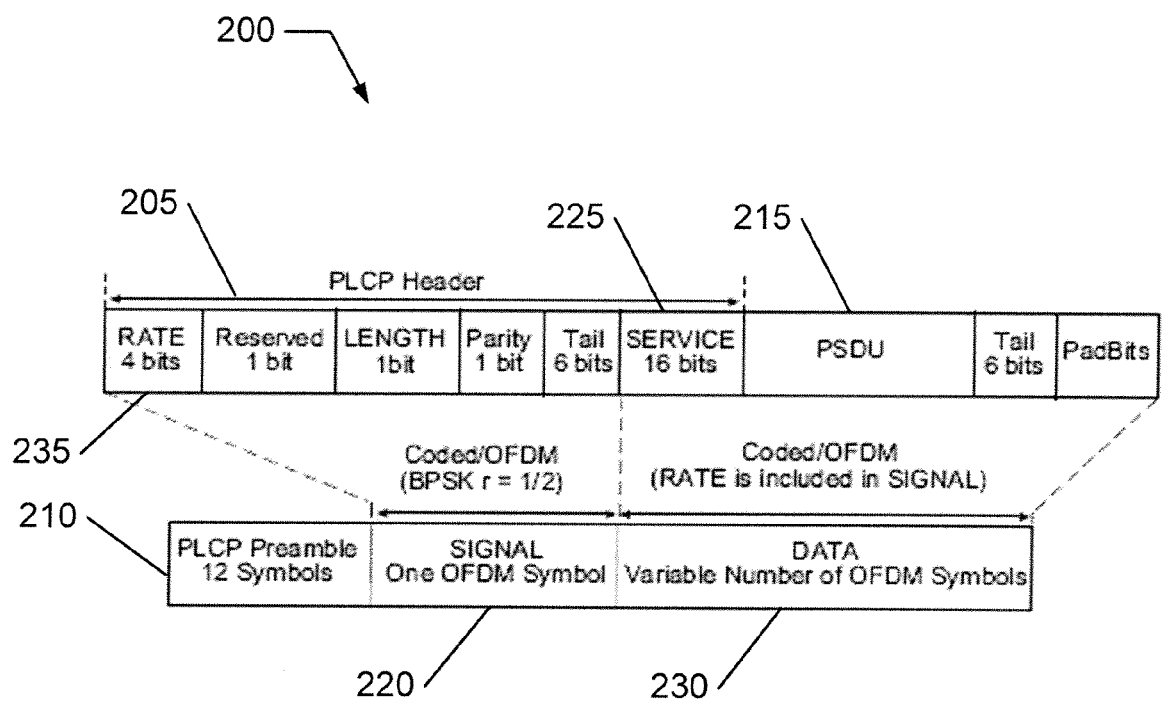
FIG. 2 illustrates a prior art Physical Layer Protocol Data Unit ("PPDU") according to the IEEE 802.11 family of protocols.
Figure 6:
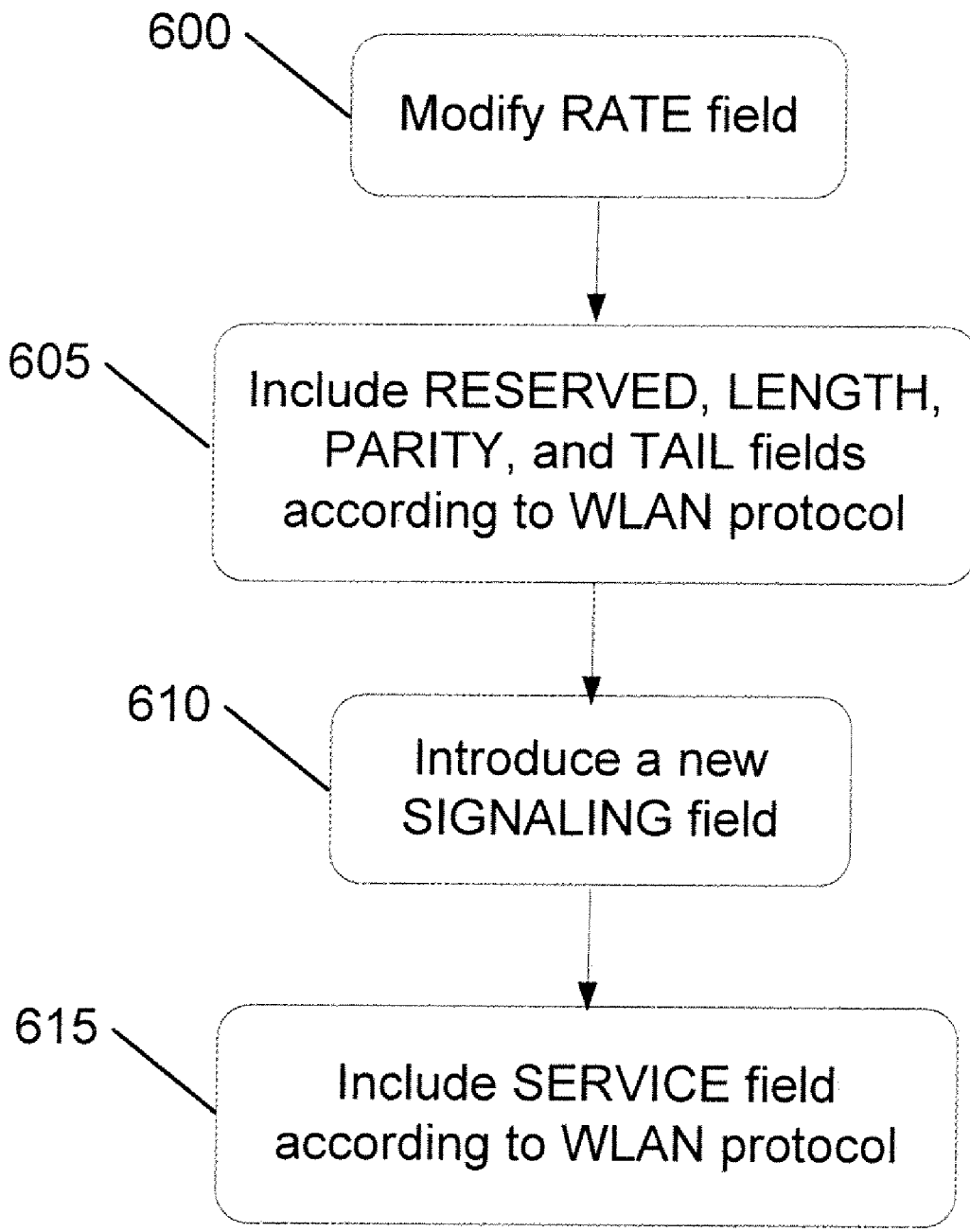
FIG. 6 illustrates a flow chart for modifying the physical layer header of the WLAN protocol to include dynamic OFDM allocations in accordance with an embodiment of the invention.

Referring now to FIG. 6, a flow chart for modifying the physical layer header of the WLAN protocol to include dynamic OFDM allocations in accordance with an embodiment of the invention is described. The PLCP header 205 specified in the IEEE 802.11 protocols and shown in FIG. 2 is modified to include the dynamic OFDM allocations to the receiver. First, the RATE field 235 of PLCP header 205 is modified to include a different bit sequence not specified in the IEEE 802.11 protocols (600). The new bit sequence, e.g., 1100, is proposed as identification that the data transmission to follow supports dynamic OFDM. After the RATE field 235 is modified, the subsequent fields RESERVED, LENGTH, PARITY, and TAIL of the PLCP header 205 are included as specified in the IEEE 802.11 protocols (605).

After the TAIL field, a new field is introduced in the PLCP header 205, namely, a SIGNALING field (610). This field contains all the information required to transmit the dynamic OFDM allocations to the receiver so that the receiver may properly decode dynamic OFDM-coded data. The layout of the SIGNALING field is described in more detail herein below. After the new SIGNALING field, the SERVICE field of the PLCP header 205 is included as specified in the IEEE 802.11 protocols (615).

Figure 7:
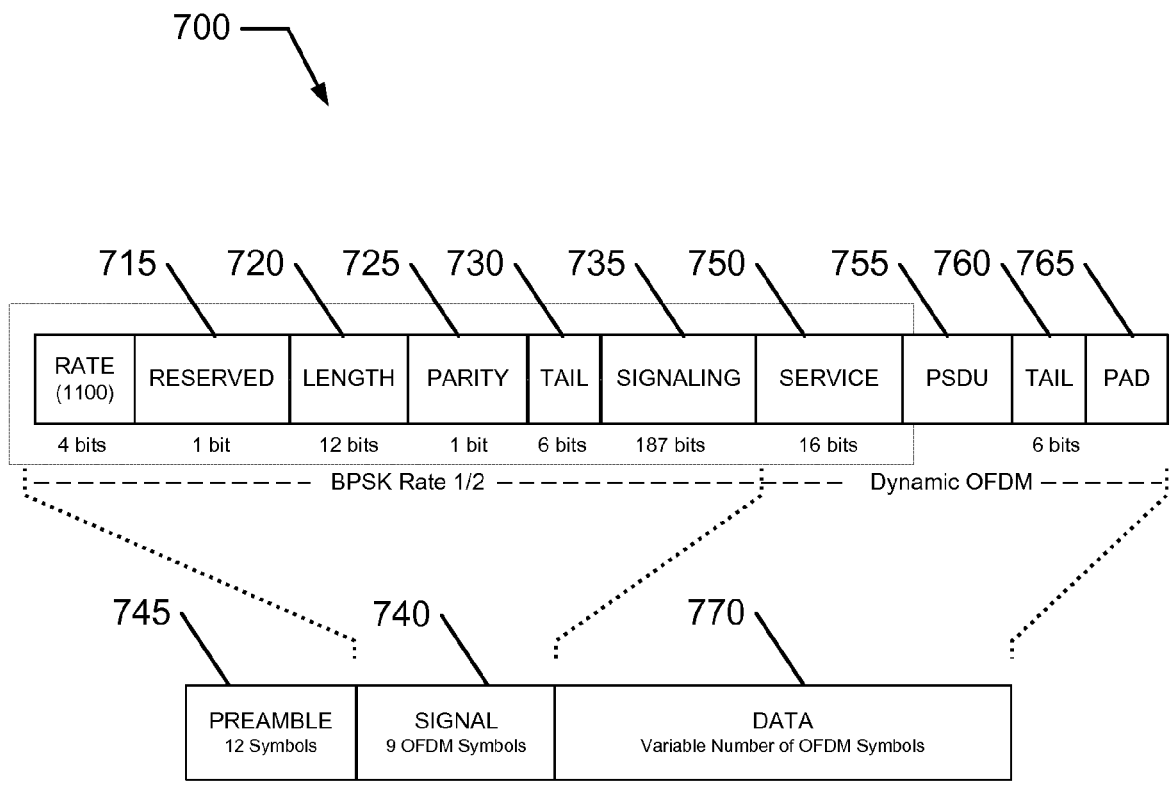
FIG. 7 illustrates a new physical layer header for a WLAN protocol incorporating dynamic OFDM in accordance with an embodiment of the invention.

Referring now to FIG. 7, a new physical layer frame for a WLAN protocol incorporating dynamic OFDM in accordance with an embodiment of the invention is described. PLCP frame 700 includes a modified PLCP header 705 having a modified RATE field 710, a RESERVE field 715, a LENGTH field 720, a PARITY field 725, a TAIL field 730, a new SIGNALING field 735 (described in more detail below) and a SERVICE field 750.

Modified RATE field 710 indicates that the data transmission to follow PLCP header 705 supports dynamic OFDM. RESERVE field 715, LENGTH field 720, PARITY field 725, and TAIL field 730 follow RATE field 710 and are encoded as specified in the IEEE 802.11 protocols.

A new SIGNALING field 735 follow fields 710-730. The SIGNALING field 735 indicates the dynamic OFDM allocations generated by the transmitter, as described herein below. Fields 710-735 are coded together with a fixed number of OFDM symbols 740, e.g., 9 OFDM symbols, following the PCLP preamble 745 used for synchronization purposes. After the SIGNALING field 735, the SERVICE field 750 is added as specified in the IEEE 802.11 protocols.

The data portion of the new PLCP frame 700 follows the new PLCP header 705. The PSDU 755 is conveyed as an IEEE 802.11 MAC packet with a payload, i.e., the data coded according to the dynamic OFDM allocations. SERVICE field 750, PSDU 755, and tail fields TAIL 760 and PAD 765 are encoded with a variable number of OFDM symbols in DATA field 770.

The complete PLCP header 705 is coded with the most robust combination of BPSK modulation and a convolutional coding rate of R=12. Compared to traditional OFDM-based IEEE 802.11 protocols, the new PLCP header 705 is only longer by the number of symbols, e.g., 8, required by the new SIGNALING field 735.

Figure 8:
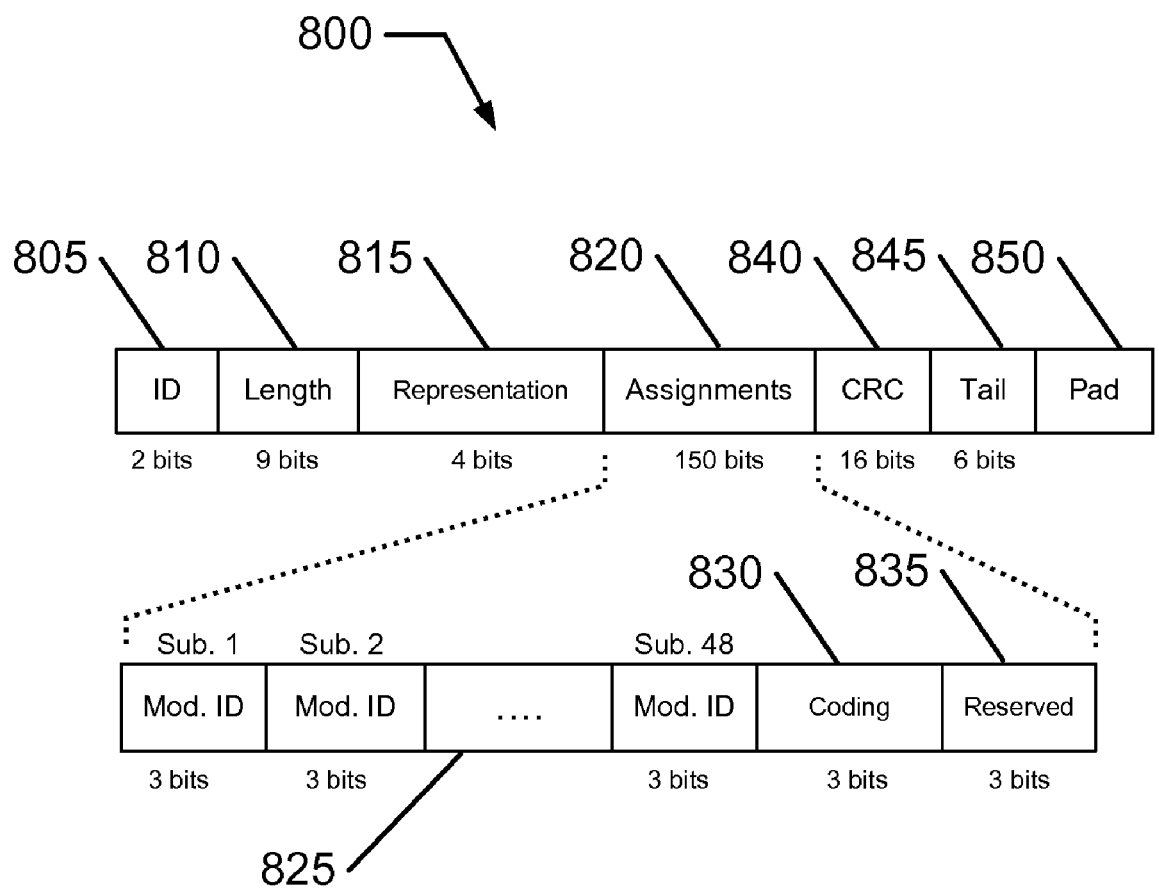
FIG. 8 illustrates a new SIGNALING field for use in the new physical layer header of FIG. 7 for a point-to-point mode in accordance with an embodiment of the invention.

FIG. 8 illustrates a new SIGNALING field for use in the new PLCP header of FIG. 7 in accordance with an embodiment of the invention. Initially, an ID field 805 is transmitted with 2 bits in length (in case that the specific modified RATE field bit combination of 1100 is used by other extensions to the IEEE 802.11 protocols). Next, a LENGTH field 810 is inserted to indicate the complete size of SIGNALING field 800. LENGTH field 810 may be, for example, 9 bits long. The third field is the REPRESENTATION field 815. REPRESENTATION field 815 is used to primarily indicate different ways of representing the signaling information. For example, REPRESENTATION field 815 may be 4 bits long to indicate that the information in the SIGNALING field 800 is compressed.

The dynamic OFDM allocations are included in an ASSIGNMENTS field 820 following REPRESENTATION field 815. ASSIGNMENTS field 820 contains the modulation type assigned to each one of the 48 sub-carriers. Because a sub-carrier may not be utilized at all, i.e., is not allocated any power or modulation type, 3 bits are used to encode the modulation types for the 48 sub-carriers, resulting in a total of 144 bits. Modulation type identifiers 825 may then be used to indicate a total of five modulation allocations: (1) no modulation in case a sub-carrier is not used; (2) BPSK; (3) QPSK; (4) 16-QAM; and (5) 64-QAM.

In one embodiment, the modulation type identifiers 825 are transmitted sequentially for the 48 sub-carriers without any further delimiter, with one identifier for each sub-carrier (i.e., a total of 48 3-bit identifiers for the 48 sub-carriers, resulting in a total of 144 bits). At the end of the ASSIGNMENTS field 820, a Coding sub-field 830 is used to indicate the coding scheme and a Reserved sub-field 835 is reserved for any other use. The Coding sub-field 830 may be encoded with, for example, 3 bits and the Reserved sub-field 835 may be encoded with 3 bits as well, resulting in a total of 150 bits for the ASSIGNMENTS field 820. Finally, a 16 bit CRC field 840 and a 6-bit TAIL field 845 are included at the end of the SIGNALING field 800. A PAD field 850 may also be included after TAIL field 845 for any padding bits if necessary.

In total, SIGNALING field 800 has 187 bits, 150 bits for the ASSIGNMENTS field 820, 15 bits for the ID, LENGTH, and REPRESENTATION fields 805-815, and 22 bits for the CODING and TAIL fields 840-845. As indicated above, REPRESENTATION field 815 may be used to indicate whether compression is applied to the ASSIGNMENTS field 820 or other fields as well. In this case, the length of SIGNALING field 800 can be decreased by the usage of compression schemes for the ASSIGNMENTS field 820.

It is appreciated by one of ordinary skill in the art that new PLCP header 805 is only 8 octets longer than the PLCP header 205 specified in the IEEE 802.11 protocols. These 8 octets are represented with 8 OFDM symbols, resulting in a time span of 32 μs. The extra PLCP header length and transmission time in the ASSIGNMENTS field 820 add a small overhead to the WLAN protocol that is more than compensated for the performance gains resulting from the use of dynamic OFDM, as described below.

It is appreciated that the time and computational resources used to determine the dynamic OFDM allocations, although also resulting in a small overhead to the WLAN protocol, must be accounted for when setting the network allocation vector ("NAV"). The problem arises in that in traditional OFDM-based WLAN protocols, e.g., the IEEE 802.11 protocols, the transmitter already knows the duration of the data frame transmission when conveying the RTS frame (and setting the NAV in the RTS frame) during a control handshake with the receiver. With the use of dynamic OFDM, however, dynamic OFDM allocations are generated to adapt to the sub-carrier gains. Because the gains are only known after reception of the CTS frame during the control handshake with the receiver, a new approach for managing the NAV must be considered.

Figure 9:
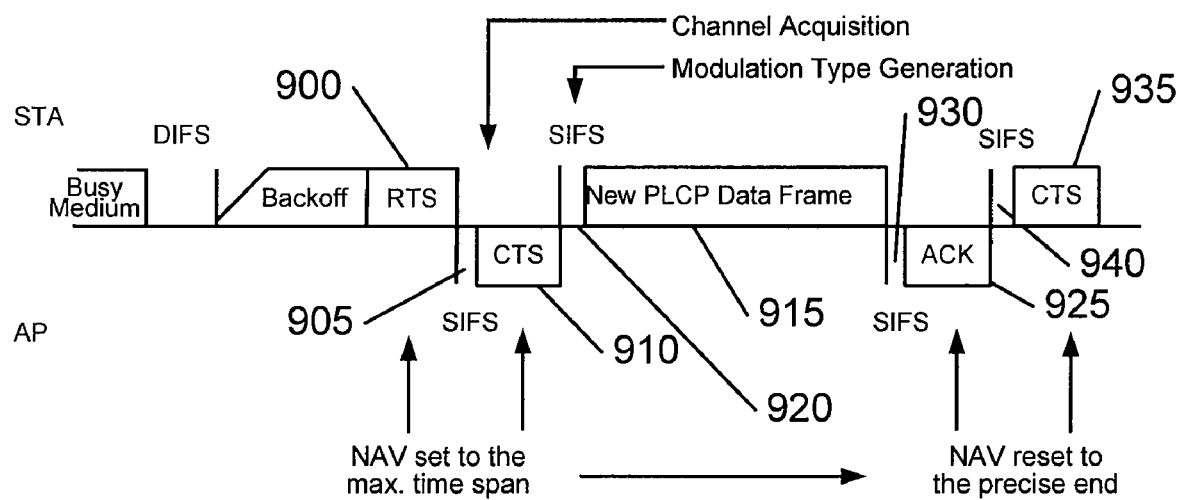
FIG. 9 illustrates a schematic diagram of a transmission sequence for transmitting a dynamic OFDM data frame in a point-to-point mode in accordance with an embodiment of the invention.

Referring now to FIG. 9, a schematic diagram of a transmission sequence for transmitting a dynamic OFDM data frame in a point-to-point mode in accordance with an embodiment of the invention is described. The transmitter starts a dynamic OFDM packet transmission by conveying a normal RTS frame 900, as specified by the IEEE 802.11 protocols. RTS frame 900 initially sets the NAV to the longest possible duration which would be required by worst channel characteristics, as specified by the IEEE 802.11 protocols. After the duration of a SIFS 905, i.e., 16 μs, the receiver replies with a CTS frame 910, also transmitted according to the IEEE 802.11 protocols. CTS frame 910 also announces the NAV value set by RTS frame 900.

After acquiring the channel state from the preamble of CTS frame 910, generating the dynamic OFDM allocations, and coding the data accordingly, the transmitter computes the length required to transmit the data, sets the correct value for the NAV. A new PLCP data frame 915 is then transmitted after SIFS 920.

As described above, the dynamic OFDM allocations may be generated with any algorithm known by one of ordinary skill in the art. For example, the dynamic OFDM allocations may be generated with any one of the algorithms described in M. Bohge. J. Gross, M. Meyer, and A. Wolisz, "Dynamic Resource Allocation in OFDM Systems: An Overview of Cross-Layer Optimization Principles and Techniques", IEEE Network Magazine, Special Issue: "Evolution toward 4G wireless networking", vol. 21, no. 1, pp. 53-59, January/February 2007.

As the NAV is conveyed in a MAC packet and the MAC packet is part of the PSDU in the new PLCP data frame 915, other listening stations in the same ESS as the receiver may not receive the corrected NAV at all. This is because these other listening stations are expecting a traditional OFDM PLCP data frame 200 instead of the new PLCP data frame 915. When they receive the new PLCP data frame 915, their network interface cards ("NICs") discard the new frame upon decoding the modified RATE field into an unexpected value (e.g., the 1010 bit sequence that may be used to indicate a dynamic OFDM transmission). To prevent these other listening stations from accessing the WM before the corrected value for the NAV indicating the transmission duration is up, the NAV must be reset after the transmission.

In one embodiment, this is accomplished by having the receiver send an ACK frame 925 after SIFS 930 following the new PLCP data frame 915. The ACK frame 925 resets the NAV to a value just long enough to cover a new CTS frame 935 after SIFS 940 addressed to (and transmitted by) the transmitter itself. This finally sets the NAV to zero, releasing the WM, and ensuring that the NAV is set to the correct value for all listening stations.

It is appreciated that any transmitter may communicate using dynamic OFDM with a designated receiver, for example, an AP. The designated receiver may announce support for dynamic OFDM communications to a potential transmitter by, in one embodiment, using a special capability field of a CTS-to-self frame sent by the receiver (i.e., a CTS frame sent by the receiver addressed to itself) prior to the start of transmission by the potential transmitter. If a station receives such a CTS-to-self frame by the receiver, it will trigger its dynamic OFDM transmissions the first time it transmits a data frame to the receiver. The receiver may then update its list of associated stations to reflect the dynamic OFDM support by the transmitter.

To evaluate the performance of dynamic OFDM versus traditional OFDM communications in IEEE 802.11 protocols, a simple set-up consisting of one IEEE 802.11a AP and one corresponding station is configured for simulation. The AP is assumed to always have a packet, i.e., a MAC Protocol Data Unit ("MPDU"), of a fixed size to be transmitted to the station (saturation mode). The AP waits until the WM is free and starts the transmission after an eventual backoff window. The AP then starts the transmission of a PLCP frame either by applying traditional IEEE 802.11a/g protocols or by applying the modified IEEE 802.11 protocols supporting dynamic OFDM.

It is appreciated that the simulations described herein below focus only on the DCF infrastructure mode of the IEEE 802.11 protocols. As performance metric, the time span required to transmit an MPDU successfully is considered. These metrics take into account the increase in spectral efficiency, the additional overhead imposed with the new PLCP frame, and the computational and time resources used for generating the dynamic OFDM allocations, as described above.

A total of four different simulation schemes are considered: (1) traditional IEEE 802.11a/g protocols without an RTS/CTS handshake; (2) traditional IEEE 802.11a/g protocols with an RTS/CTS handshake; (3) modified IEEE 802.11 protocols incorporating dynamic OFDM according to an embodiment of the invention applying adaptive modulation (i.e., the transmit power is distributed equally among the 48 sub-carriers); and (4) modified IEEE 802.11 protocols incorporating dynamic OFDM according to an embodiment of the invention applying bit loading.

The specific adaptation strategy for each simulation scheme is as follows. In the case of traditional IEEE 802.11a/g protocols, it is appreciated that there exists an optimal link adaptation strategy. Unfortunately, to perform this optimal link adaptation strategy, the transmitter is required to know the current average SNR. In the case of simulation scheme (2) above, this knowledge can be assumed to be present at the station (due to the RTS/CTS handshake). In contrast, in the case of simulation scheme (1), the station could only utilize its average SNR value of the last received Beacon frame of its corresponding AP. This information is most likely outdated, as Beacon frames are transmitted often with a period of 100 ms. However, it is assumed that the station can adapt the transmission rate optimally. This is an assumption which strongly favors the traditional simulation schemes (1) and (2), at least regarding simulation scheme (1).

In case of the dynamic OFDM simulation schemes (3) and (4), the sub-carrier modulation types are adapted such that the resulting average bit error probability ("BEP") equals the average BEP of a traditional IEEE 802.11 transmission. A current "snap-shot" of the 48 sub-carriers is considered. Clearly, the attenuation varies per sub-carrier. Hence, as traditional IEEE 802.11 protocols apply the same transmit power and modulation type to each sub-carrier, the resulting BEP varies per sub-carrier as well.

As described above, the adaptation may be performed by using any algorithm known to one of ordinary skill in the art. For example, the dynamic OFDM allocations may be generated with any one of the algorithms described in M. Bohge, J. Gross, M. Meyer, and A. Wolisz, "Dynamic Resource Allocation in OFDM Systems: An Overview of Cross-Layer Optimization Principles and Techniques", IEEE Network Magazine, Special Issue: "Evolution toward 4G wireless networking", vol. 21, no. 1, pp. 53-59, January/February 2007.

Given these BEPs per sub-carrier, an average over all sub-carriers, $p_{max}$, can be obtained for the traditional simulation schemes (1) and (2). This average value is used in the dynamic OFDM simulation scheme (3) to perform the adaptive modulation. In simulation scheme (4), the station applies the following adaptation scheme. During the loading process, the power amounts for each modulation type and sub-carrier are generated such that any sub-carrier features at least $p_{max}$. The difference between simulation schemes (3) and (4) is that in simulation scheme (3) no power loading is applied. Instead, the transmit power is distributed statistically and for each resulting SNR per sub-carrier the corresponding modulation type is chosen (with respect to $p_{max}$). In contrast, in simulation scheme (4) a full blown bit loading algorithm is applied.

As the four simulation schemes are identical regarding their average BEP probability in the physical layer, the total frame error rate is assumed to be equal as well for a given (stable) attenuation per sub-carrier. Again, this is in favor of the traditional simulation schemes (1) and (2), as the link adaptation strategy leads to an uneven bit error distribution in the physical layer. However, perfect interleaving is assumed, such that any impact due to the different bit error distributions regarding the four different simulation schemes is not taken into account.

Finally, after the station transmits a given PLCP frame, it waits for an acknowledgement ("ACK") frame from the AP. It is assumed that MPDUSs are transmitted correctly, as only the time span difference between a successful transmission due to the traditional IEEE 802.11a/g protocols used in simulation schemes (1) and (2) compared to the modified IEEE 802.11 protocols incorporating dynamic OFDM of simulation schemes (3) and (4) is of interest. As both transmission schemes have the same average BEP in the physical layer, they have the same frame error rates as well. Therefore, considering frame errors and the corresponding retransmissions does not change the qualitative difference between the four simulation schemes described herein below.

The following parameterization and methodology is chosen for this basic simulation scenario. The cell radius is set to $r_{cell}$=80 m, the center frequency is $f_c$=5.2 GHz, the maximum transmit power equals $p_{max}$=10 mW. The bandwidth, the number of sub-carriers, the symbol duration and the guard interval are all chosen in accordance to traditional IEEE 802.11 protocols.

The sub-carrier attenuations $h_n^{(t)}$ are generated based on path loss, shadowing and fading. For the path loss, a standard model is assumed, parameterized by K=−46.7 dB and α=2.4 (corresponding to a large open space propagation environment). For shadowing $h_{sh}^{(t)}$, independent stochastic samples from a log-normal distribution, characterized by a zero mean and a variance of $\sigma_{sh}^2$=5.8 dB, are assumed. The shadowing component changes every second. Each sample $h_{fad}^{(t)}$ of the fading process is assumed to be Rayleigh-distributed. The frequency and time correlation of $h_{fad}^{(t)}$ are characterized by a Jakes-like power spectrum and an exponential power delay profile (parameterized by the maximum speed within the propagation environment, set to $v_{max}$=1 m/s, the center frequency and the delay spread, set to 0.15 μs).

It is appreciated that for WLANs, the wireless channel can safely be assumed to be constant over a time horizon of multiple milliseconds. Thus, in case of the dynamic OFDM simulation schemes (3) and (4), the measured sub-carrier attenuations from the CTS frames are assumed to be stable during the complete PLCP frame transmission. The noise power is computed at an average temperature of 20° C. over the bandwidth of a sub-carrier.

According to these parameters, sub-carrier attenuation traces are generated by a computer program for several stations at different positions. These channel traces are used to obtain the performance results for each simulation scheme. At every 10 ms, it is assumed that a MPDU of a certain size is passed to the physical layer. Then, another computer program reads the corresponding sub-carrier attenuations from the trace file and generates the throughput over all sub-carriers according to the considered simulation scheme.

Thus, a total time span per MPDU can be obtained as required for a successful transmission, including the reception of the acknowledgement frame. For each station and simulation scheme, this is repeated over a quite long time span (a couple of seconds), yielding a sequence of time spans. These sequences are recorded in a file and afterwards statistically analyzed. For the dynamic OFDM simulation schemes (3) and (4), the method of Hughes-Hartogs implemented in order to obtain the dynamic bit loading results.

Figure 10:
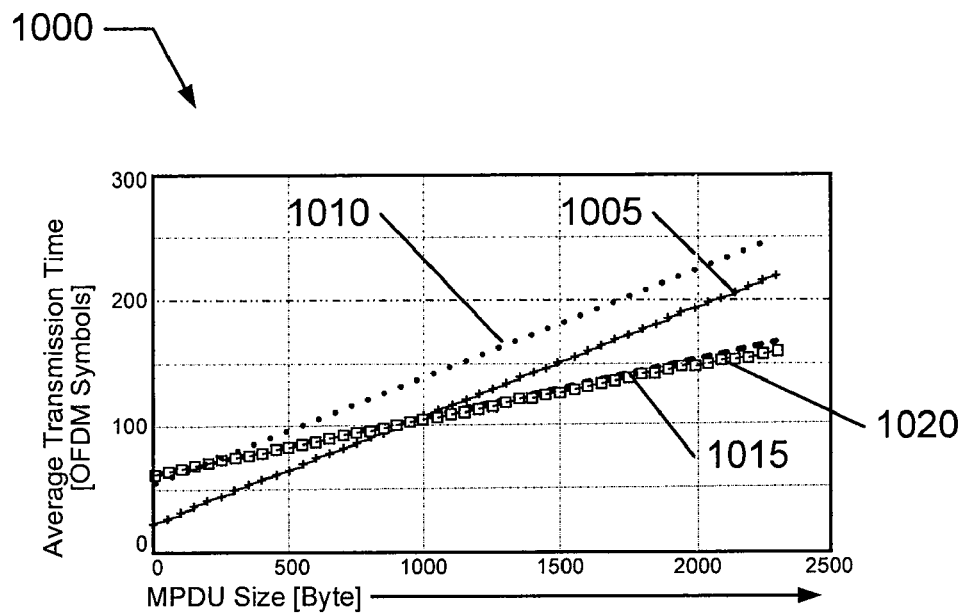
FIG. 10 illustrates the average performance results of four simulation schemes for the point-to-point mode.

Referring now to FIG. 10, the average performance results for each simulation scheme are described. Graph 1000 shows the average transmission time for OFDM symbols per MPDU size. Results for simulation scheme (1) are shown in curve 1005, results for simulation scheme (2) are shown in curve 1010, results for simulation scheme (3) are shown in curve 1015, and results for simulation scheme (4) are shown in curve 1020. Note that each point in curves 1005-1020 reflects the average transmission time over 16 different positions of stations within the BSS. Confidence intervals (at a 95% level) are below 1% for each point.

Comparing the different simulation schemes, it is appreciated that the dynamic OFDM-based schemes (3) and (4) shown in curves 1015 and 1020, respectively, outperform the traditional OFDM-based IEEE 802.11 protocols with an RTS/CTS handshake shown in curve 1010 for a MPDU size of 200 bytes on. The traditional OFDM-based IEEE 802.11 protocols without an RTS/CTS handshake shown in curve 1005 are outperformed beginning at an MPDU size of 1000 bytes.

It is appreciated that the majority of traditional IEEE 802.11 implementations apply the RTS/CTS handshake, hence, incorporating dynamic OFDM in those implementations outperform the traditional implementations quite significantly. For example, at an MPDU size of 1500 bytes (which is the typical size of IP packets), the dynamic OFDM schemes transmit the packets faster by 25%, already taking into consideration all the overhead costs.

It is also appreciated that the performance difference increases in case a frame error is present. Then, the frame is retransmitted, leading to a performance increase twice as large as in the case of a successful attempt. Also the difference between the full-blown bit loading scheme shown in curve 1020 and the adaptive modulation scheme shown in curve 1015 is rather small considering the overall average of the BSS.

Figure 11:
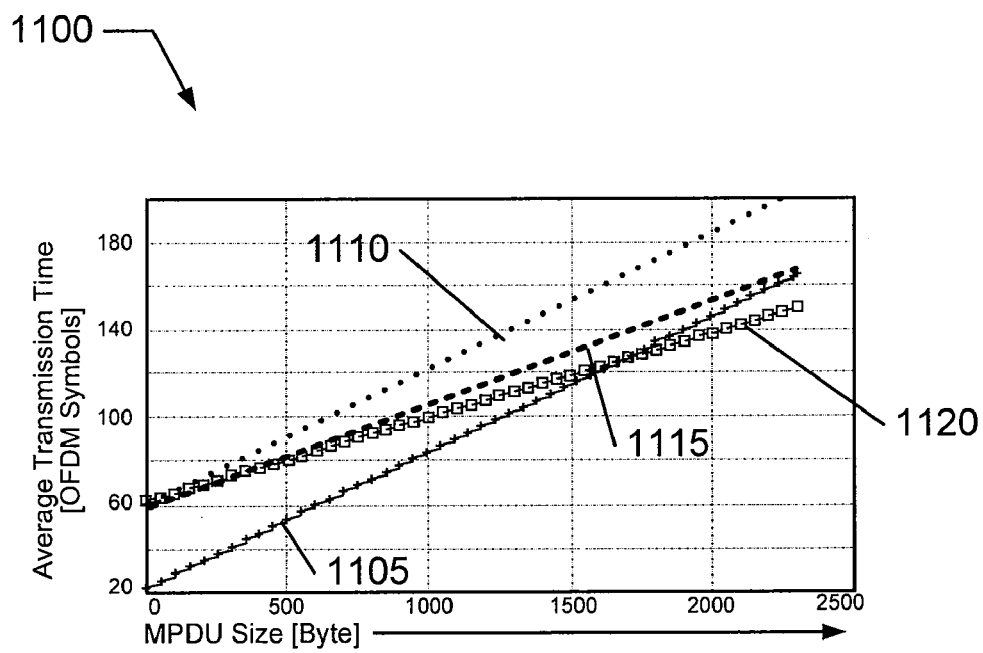
FIG. 11 illustrates the average performance results for each simulation scheme in the case of an increasing packet size for a station close to the access point.

Referring now to FIG. 11, the average performance results for each simulation scheme in the case of an increasing MPDU size for a station close to the access point are described. Graph 1100 shows the average transmission time for OFDM symbols per MPDU size. Results for simulation scheme (1) are shown in curve 1105, results for simulation scheme (2) are shown in curve 1110, results for simulation scheme (3) are shown in curve 1115, and results for simulation scheme (4) are shown in curve 1120.

In case the station is close, a bit loading algorithm (i.e., scheme (4) shown in curve 1120) pays off more in terms of throughput. However, the overall performance gain of the dynamic OFDM schemes (3) and (4) as compared to the traditional IEEE 802.11 schemes (1) and (2) is rather small. In fact, the traditional scheme (1) without an RTS/CTS handshake shown in curve 1105 achieves a better performance for any MPDU size up to 1700 bytes. However, the performance gains obtained by incorporating dynamic OFDM in the IEEE 802.11 protocols (schemes (3) and (4) shown in curves 1115 and 1120, respectively) as compared to the traditional IEEE 802.11 protocols with an RTS/CTS handshake shown in curve 1110 is still significant starting from an MPDU size of 400 bytes.

Figure 12:
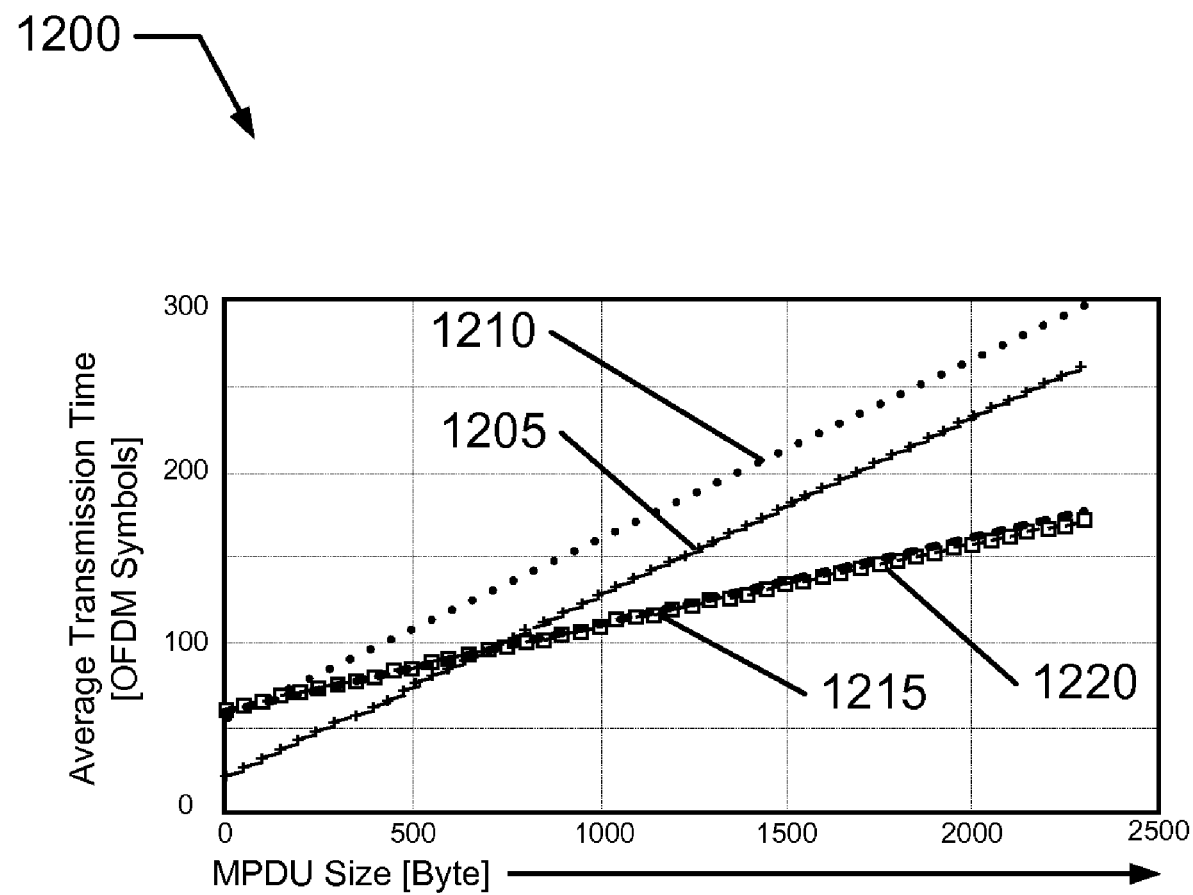
FIG. 12 illustrates the average performance results for each simulation scheme in the case of an increasing packet size for a station far away from the access point.

Referring now to FIG. 12, the average performance results for each simulation scheme in the case of an increasing MPDU size for a station far away from the access point are described. Graph 1200 shows the average transmission time for OFDM symbols per MPDU size. Results for simulation scheme (1) are shown in curve 1205, results for simulation scheme (2) are shown in curve 1210, results for simulation scheme (3) are shown in curve 1215, and results for simulation scheme (4) are shown in curve 1220.

In this case, incorporating dynamic OFDM into traditional IEEE 802.11 protocols pays off particularly well, providing a performance increase of more than 35% for an MPDU of the size of an IP packet (i.e., 1500 bytes or more). Accordingly, the "break even" point where dynamic OFDM performs substantially the same as traditional OFDM for the IEEE 802.11 protocols before it starts gaining in performance is now lower. However, in this case the difference between dynamic OFDM with adaptive modulation (curve 1215) and with bit loading is rather small (curve 1220).

Another performance metric that may be considered is the average goodput in bits per second at the physical link layer.

Figure 13:
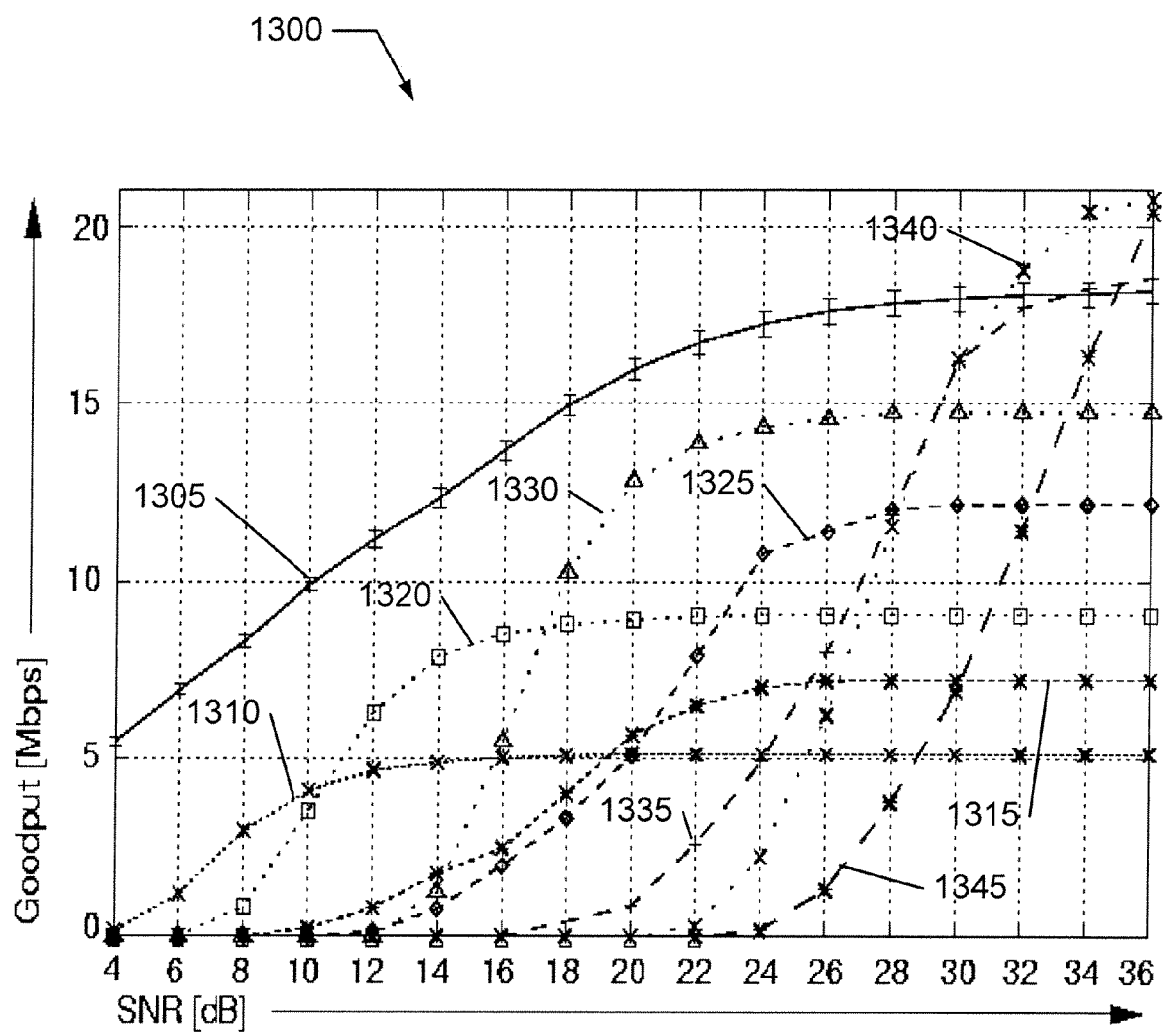
FIG. 13 illustrates the average goodput in bits per second versus the SNR for large packets for the point-to-point mode.
Figure 14:
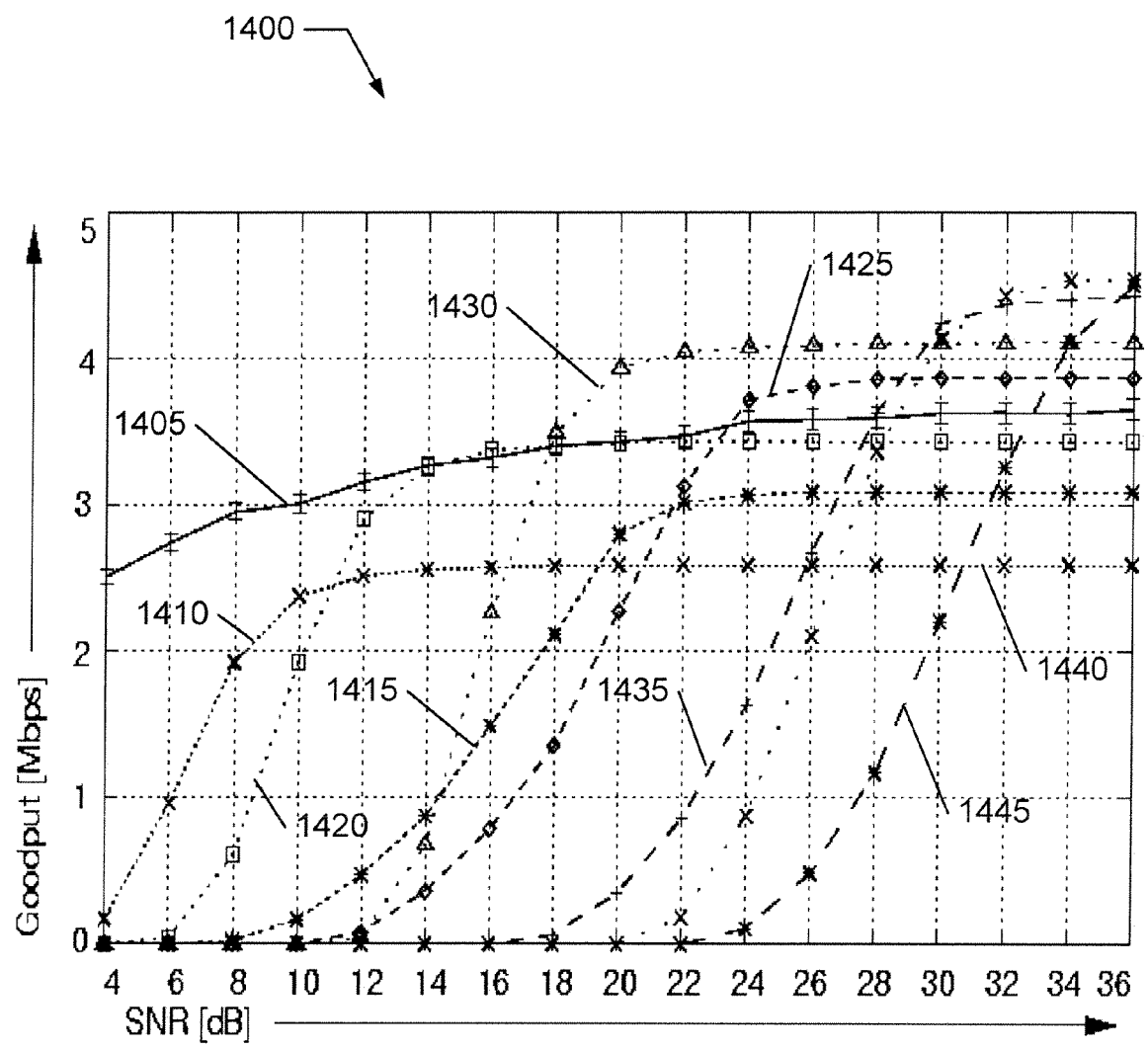
FIG. 14 illustrates the average goodput in bits per second versus the SNR for small packets for the point-to-point mode.

Referring now to FIGS. 13-14, the average goodput in bits per second versus the SNR for large (FIG. 13) and small (FIG. 14) packets are described. The results shown in FIGS. 13-14 are generated with OPNETmodeler Version 12.0.APL-5, available from OPNET Technologies, Inc., of Bethesda, Md. Modifications of standard WLAN models and protocols required to support dynamic OFDM are performed with the OPNET model library.

In particular, the simulations performed with the traditional IEEE 802.11 protocols follow the protocols as close as possible. For example, the exponential backoff that the transmitter has to perform every time after transmitting a packet is considered in this case (i.e., if a station wants to re-access the WM immediately after finishing a packet transmission, it has to go into the exponential backoff mode as specified in the protocols). Furthermore, only long preambles are considered. Packet errors are only considered in data frames. Hence, a retransmission is always due to an incorrect payload of the data frame. The distance between the transmitter and receiver (and therefore the average SNR) is varied as well as the packet size.

Graph 1300 in FIG. 13 illustrates the average goodput in bits per second versus the SNR for large packets of 1564 bytes, corresponding to a packet size of 1536 bytes plus 28 bytes for the IEEE 802.11 MAC overhead. Curve 1305 shows the results for comparison scheme (3), curve 1310 shows the results for comparison scheme (1) employing BPSK as its modulation type at a coding rate of ½, curve 1315 shows the results for comparison scheme (1) employing BPSK as its modulation type at a coding rate of ¾, curve 1320 shows the results for comparison scheme (1) employing QPSK as its modulation type at a coding rate of ½, curve 1325 shows the results for comparison scheme (1) employing QPSK as its modulation type at a coding rate of ¾, curve 1330 shows the results for comparison scheme (1) employing 16-QAM as its modulation type at a coding rate of ½, curve 1335 shows the results for comparison scheme (1) employing 16-QAM as its modulation type at a coding rate of ¾, curve 1340 shows the results for comparison scheme (1) employing 64-QAM as its modulation type at a coding rate of ½, and curve 1345 shows the results for comparison scheme (1) employing 64-QAM as its modulation type at a coding rate of ¾.

It is appreciated by one of ordinary skill in the art that an RTS/CTS control handshake is typically performed for packets of this large size. As illustrated in graph 1300, in case of large packets, comparison scheme (3) shown in curve 1305 outperforms the traditional OFDM-based IEEE 802.11 protocols for almost all SNR value considered for the different modulation type-coding rate combinations (1310-1345). The traditional OFDM-based IEEE protocols outperform comparison scheme (3) shown in curve 1305 only at very large SNR values (above 32 dB). Below these SNR values, the performance difference is larger than 100% for almost all SNR values considered.

Similarly, graph 1400 in FIG. 14 illustrates the average goodput in bits per second versus the SNR for small packets of 228 bytes, corresponding to a packet size of 200 bytes plus 28 bytes of MAC overhead. Such packets are used for example in VoIP applications with a G.711 encoder and a bit rate of 64 Kbps. Curve 1405 shows the results for comparison scheme (3), curve 1410 shows the results for comparison scheme (1) employing BPSK as its modulation type at a coding rate of ½, curve 1415 shows the results for comparison scheme (1) employing BPSK as its modulation type at a coding rate of ¾, curve 1420 shows the results for comparison scheme (1) employing QPSK as its modulation type at a coding rate of ½, curve 1425 shows the results for comparison scheme (1) employing QPSK as its modulation type at a coding rate of ¾, curve 1430 shows the results for comparison scheme (1) employing 16-QAM as its modulation type at a coding rate of ½, curve 1435 shows the results for comparison scheme (1) employing 16-QAM as its modulation type at a coding rate of ¾, curve 1440 shows the results for comparison scheme (1) employing 64-QAM as its modulation type at a coding rate of ½, and curve 1445 shows the results for comparison scheme (1) employing 64-QAM as its modulation type at a coding rate of ¾.

As illustrated in graph 1400, in case of small packets, the usage of the RTS/CTS handshake has a considerable impact on the performance. In this case, the goodput difference is smaller but still significant for an SNR up to 16 dB. At an SNR of 18 dB, comparison scheme (1) employing 16-QAM as its modulation type at a coding rate of ½ (1430) achieves a better goodput and thereafter the several traditional OFDM-based modes perform better.

Point-to-Multipoint Mode

The above discussion for applying dynamic OFDM in a point-to-point communications mode can also be extended to the point-to-multipoint scenario, in which dynamic OFDM communications are supported between a transmitter communicating with two or more receivers. In case the transmitter holds packets for several different receivers, it may initiate the transmission of a multi-user data frame.

One of ordinary skill in the art appreciates that OFDM systems can exploit multi-user diversity by assigning different sets of sub-carriers to different stations. Applying such a scheme requires that multiple packets are transmitted within a single medium access (in addition to the even higher PHY efficiency that can be achieved by dynamic multi-user OFDM schemes as compared to point-to-point schemes). However, there are a few more changes required than in the case of point-to-point communications.

Figure 15:
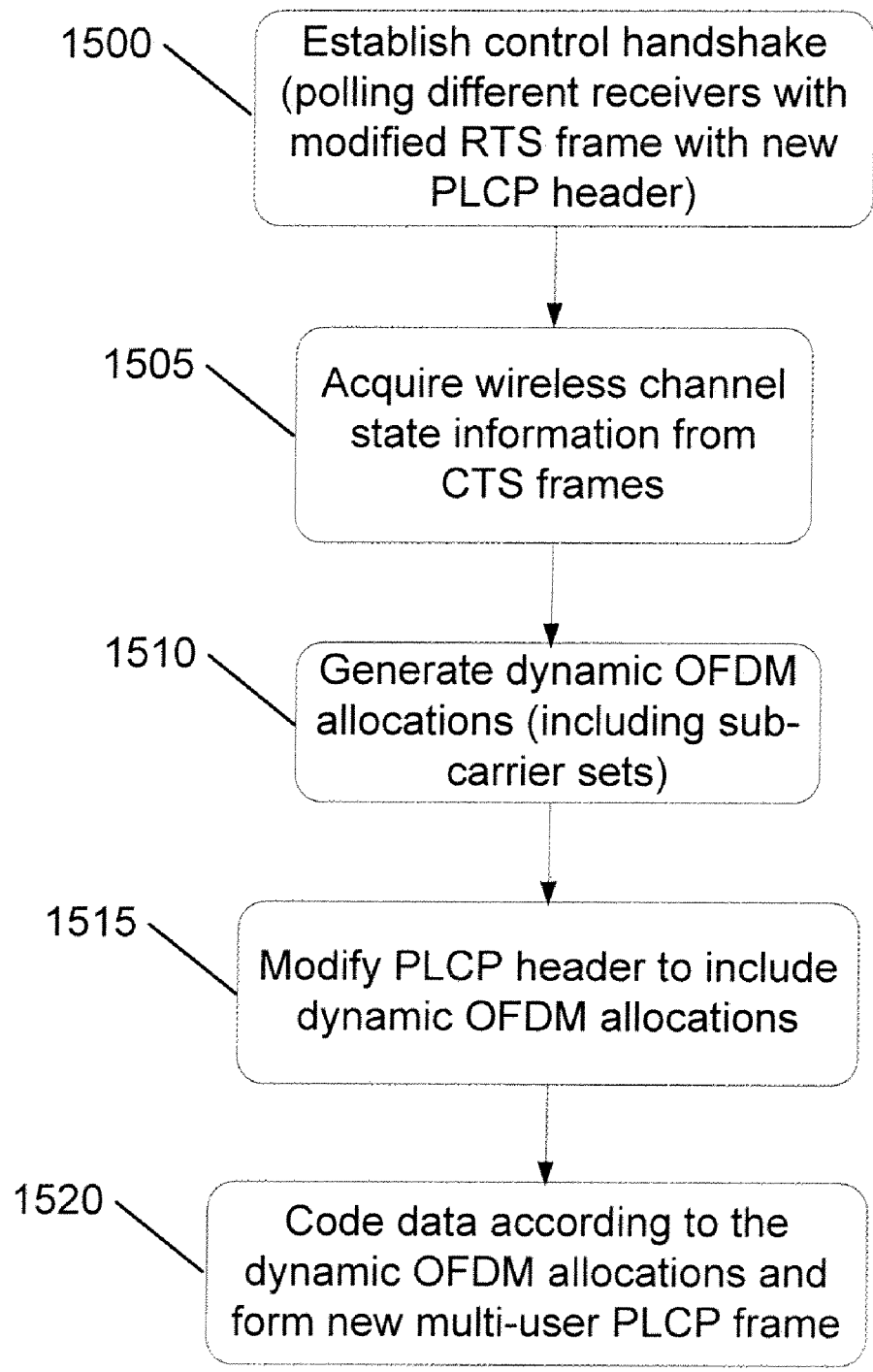
FIG. 15 illustrates a flow chart for incorporating dynamic OFDM in a point-to-multipoint mode of a WLAN protocol in accordance with an embodiment of the invention.

Referring now to FIG. 15, a flow chart for incorporating dynamic OFDM in a point-to-multipoint mode of a WLAN protocol in accordance with an embodiment of the invention is described. First, the transmitter has to obtain the wireless channel state information from the different receivers. To do so, a control handshake is established between the transmitter and the different receivers within the WLAN (1500).

In one embodiment, the control handshake is implemented by having the transmitter, e.g., the AP, transmit a modified RTS frame with a new PLCP header similar to the new PLCP header 705 described above with reference to FIG. 7. However, the SIGNALING field 735 in this new header contains, instead of the dynamic OFDM allocations, a sorted list of identifiers, e.g., 4-bit identifiers, corresponding to the different receivers, e.g., stations. This sorted list indicates a transmit order for the CTS frames transmitted by the different stations upon receiving the modified RTS frame.

Each station "polled" by this modified RTS frame replies with a CTS frame using a traditional PLCP frame, i.e., PLCP frame 200 shown in FIG. 2. Each PLCP frame is separated by a SIFS. As a result, the AP obtains the wireless channel state information one after the other from each station based on the received CLS frames (1505) without wasting resources in having to poll each station separately. It is appreciated that the modified PLCP header transmitted for the RTS frame is identified as such in the ID field of the SIGNALING field 735.

Based on the channel state information obtained from the CTS frames (specifically from the preambles of the CTS frames), the transmitter generates the appropriate dynamic OFDM allocations per sub-carrier (1510). The dynamic OFDM allocations are generated for the transmit power and/ or modulation type per sub-carrier either by applying bit loading or by applying adaptive modulation.

As described above, the dynamic OFDM allocations may be generated with any algorithm known by one of ordinary skill in the art. For example, the dynamic OFDM allocations may be generated with any one of the algorithms described in M. Bohge, J. Gross, M. Meyer, and A. Wolisz, "Dynamic Resource Allocation in OFDM Systems: An Overview of Cross-Layer Optimization Principles and Techniques", IEEE Network Magazine, Special Issue: "Evolution toward 4G wireless networking", vol. 21, no. 1, pp. 53-59, January/February 2007.

However, the generation of the dynamic OFDM allocations is more complex than in the point-to-point mode. Apart from the dynamic power and modulation allocations, the AP also assigns different sub-carrier sets to different stations in a frequency-division multiplexing ("FDM") fashion. That is, several packets are transmitted in parallel during a new multi-user data frame.

One possible goal of the dynamic OFDM allocation strategy is to minimize the total transmission time of the parallel packet transmission. In this case, the allocation strategy may try to maximize the lowest throughput of all stations currently involved in this transmission. For illustration purposes, consider all stations to have one packet queued, with each packet having the same size. If an allocation strategy can be generated which maximizes the minimal throughput of all stations involved, this leads to a substantially error-free and successful transmission of each packet. More precisely, the total duration during which the WM is occupied, is determined by the station which has received the lowest throughput (as all packets are equal in size, then this station requires the longest time to receive its packet). Therefore, the optimal multi-user allocation strategy is to maximize the lowest throughput until all stations have nearly substantially the same one. If still some stations happen to finish their transmission prior to other stations, bits are padded to fill up the frame of the corresponding stations.

It is appreciated by one of ordinary skill in the art that this allocation strategy has been frequently considered in the art as the rate-adaptive assignment problem. In contrast to the allocation strategy in the point-to-point mode, this problem cannot be expected to be solved optimally in a time span close to a SIFS or even a DIFS. However, there exist several approximation schemes, such as those described in M. Bohge, J. Gross, M. Meyer, and A. Wolisz, "Dynamic Resource Allocation in OFDM Systems: An Overview of Cross-Layer Optimization Principles and Techniques", IEEE Network Magazine, Special Issue: "Evolution toward 4G wireless networking", vol. 21, no. 1, pp. 53-59, January/February 2007, which are known to have quite low run times especially if the number of stations included is not too high.

Therefore, in one embodiment, it is proposed that at most 8 stations are included in a point-to-multipoint transmission to reduce the required run times for suboptimal schemes down to acceptable durations. It is appreciated by one of ordinary skill in the art that more stations can be included if faster allocation strategies are available.

The generation of dynamic OFDM allocations in the point-to-multipoint mode occurs in two phases. First, sub-carrier assignments are generated, i.e., sub-carrier sets are assigned to the different stations. Next, the power and modulation type allocations are performed for each station.

It is further appreciated that certain approximation schemes can even be pipelined, such that the AP starts processing the sub-carrier assignments after the first two or three channel gains have been acquired. This leads to the result that even in the point-to-multipoint case, the allocations can be generated fast enough such that no busy tone is required to be transmitted.

In order to transmit the dynamic OFDM allocations to the receiver, the AP modifies the physical layer header of the WLAN protocol (1515). For example, the AP modifies the PLCP header of the WLAN protocol, to include the dynamic OFDM allocations in the header and create a new PLCP header similar to PLCP header 705 created for the point-to-point mode. Lastly, once the allocations are generated, each packet is encoded individually with an error correction code and the new multi-user PLCP data frame is built (1520).

Figure 16:
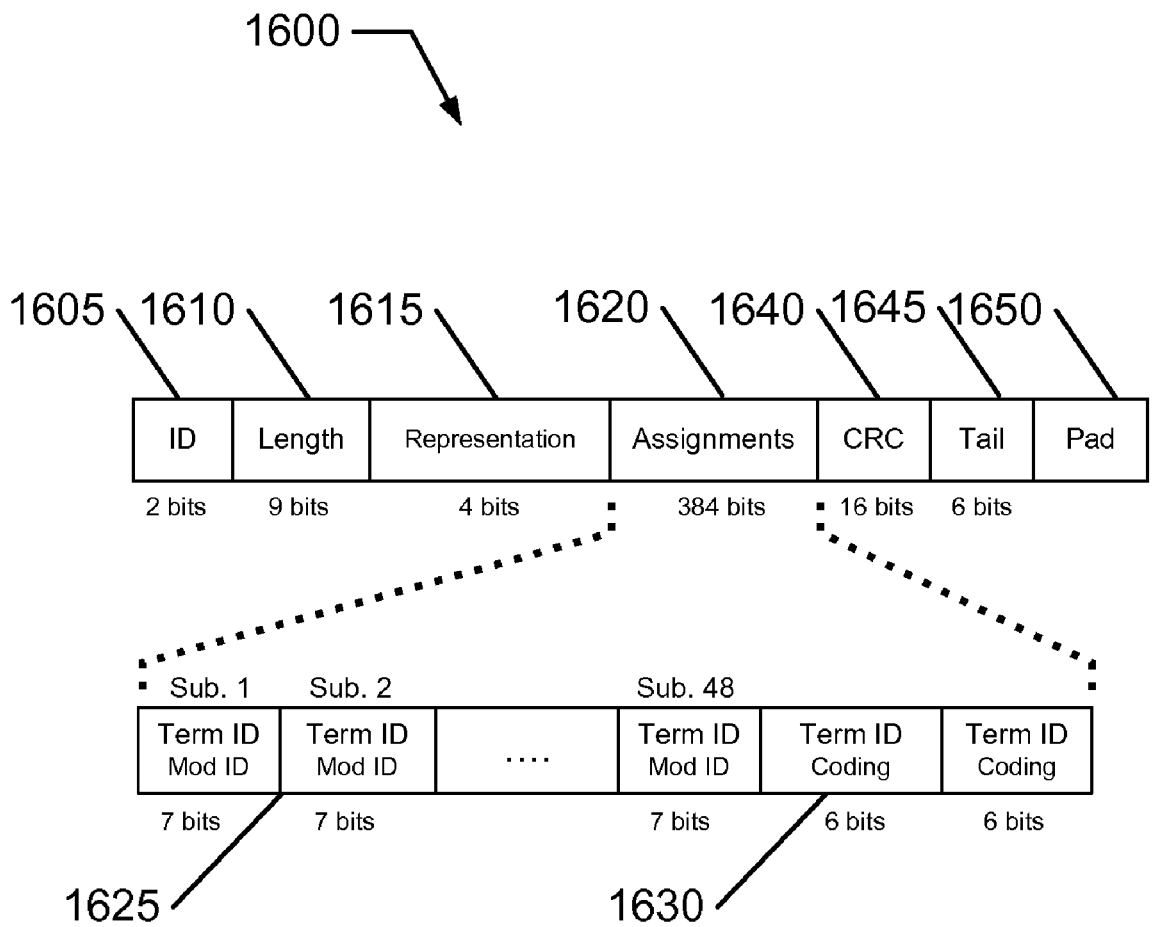
FIG. 16 illustrates a new SIGNALING field for use in the new physical layer header of FIG. 7 for a point-to-multipoint mode in accordance with an embodiment of the invention.

The new multi-user PLCP data frame has the same structure as the new PLCP data frame 700 used for the point-to-point case, with the exception of the SIGNALING field. Referring now to FIG. 16, a new SIGNALING field for use in the new PLCP header of FIG. 7 for a point-to-multipoint mode in accordance with an embodiment of the invention is described. SIGNALING field 1600 has basically the same structure as SIGNALING field 800 shown in FIG. 8 for the point-to-point mode.

However, one difference is that ID field 1605 at the beginning of SIGNALING field 1600 now indicates a point-to-multipoint communication. Another difference is that the ASSIGNMENTS field 1620 indicate the modulation type and the station for each sub-carrier, since different sub-carriers are assigned to different stations. In one embodiment, this is accomplished by building tuples 1625 of the form <Station Identifier, Modulation Identifier>, using, for example, 4 bits for the station identifiers and 3 bits for the modulation identifiers. Accordingly, ASSIGNMENTS field 1620 includes 48 of these tuples 1625.

Afterwards, the coding scheme used for each station is included in Coding sub-field 1630 by transmitting, for example, several tuples of <Station Identifier, Coding Scheme Identifier>, with each tuple corresponding to a given station. Although the stations do not know how many such tuples are transmitted, they can decode these tuples as the total length of the SIGNALING field 1600 is indicated in the LENGTH field 1610. For example, assuming a maximum of eight stations to be part of one such point-to-multipoint mode, the SIGNALING field 1600 has a total of 421 bits, which requires a total of 18 OFDM symbols (or 72 μs) of signaling overhead.

It is appreciated by one of ordinary skill in the art that increasing the number of stations and users leads to more bits required to represent each one. SIGNALING field 1600 may have to be adjusted, i.e., increased in size, to account for the additional stations.

Figure 17:
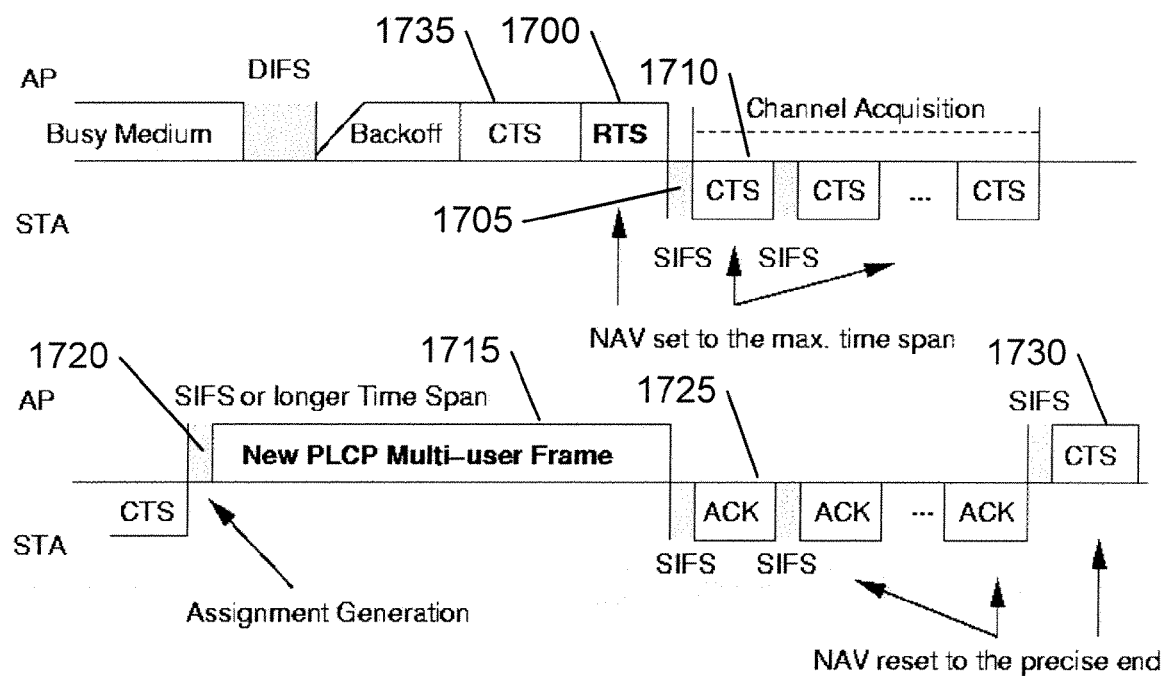
FIG. 17 illustrates a schematic diagram of a transmission sequence for transmitting a dynamic OFDM data frame in a point-to-multipoint mode in accordance with an embodiment of the invention.

Referring now to FIG. 17, a schematic diagram of a transmission sequence for transmitting a dynamic OFDM data frame in a point-to-multipoint mode in accordance with an embodiment of the invention is described. The AP starts a dynamic OFDM packet transmission by conveying a CTS-to-self frame 1735 (i.e., a CTS frame addressed to itself), after which it transmits immediately a modified RTS frame 1700, as described above. Modified RTS frame 1700 contains a sequential list of stations and initially sets the NAV to the longest possible duration which would be required by worst channel characteristics, as specified by the IEEE 802.11 protocols. After the duration of a SIFS 1705, i.e., 16 μs, each station replies with a CTS frame 1710, also transmitted according to the IEEE 802.11 protocols. CTS frame 1710 also announces the NAV value set by RTS frame 1700.

After acquiring the channel state from the preamble of CTS frames 1710, generating the dynamic OFDM allocations, and coding the data accordingly, the AP computes the length required to transmit the data and sets the correct value for the NAV. A new PLCP data frame 1715 is transmitted after SIFS 1720.

Once the new multi-user PLCP frame 1715 has been transmitted by the AP, the stations acknowledge the correct reception by transmitting ACK frames 1725, which are transmitted in the same order as in the case of the CTS frames 1710. Each of these ACK frames 1725 contains the corrected setting of the NAV. Finally, the AP transmits a CTS-to-self frame 1730, addressed to itself, in order to reset the NAV value and free the WM.

At the beginning of this transmission mode, the transmitter (e.g., the AP) cannot start right away with a modified RTS frame 1700 including a new PLCP header. This is due to the fact that the NAV has to be set correctly to ensure that all other listening stations implementing traditional OFDM-based WLAN protocols do not start transmitting in the mean time. Therefore, a CTS-to-self frame 1735 is included at the beginning of a data transmission in the point-to-multi-point mode.

To evaluate the performance of dynamic OFDM versus traditional OFDM communications in IEEE 802.11 protocols in the point-to-multipoint mode, the following scenario is considered. It is assumed that the AP has several packets for different stations in its transmit queue. For illustration purposes, the MPDU sizes of each packet are set to the same number for all stations. However, it is appreciated that dynamic OFDM can be extended to any other packet size mixture without loss in performance.

Five different simulation schemes are considered. The first four are the same as in the point-to-point mode described above. However, the MPDUs in this case are transmitted sequentially to the corresponding stations. It is also assumed that the packets are received successfully and no packet collisions occur. That is, between two successful point-to-point transmissions the AP only waits for the duration of a DIFS (as the backoff behavior is not captured in the simulations described here, which would affect all simulation schemes equally).

The fifth scheme is the point-to-multi-point transmission mode described above. As in the point-to-point mode, the dynamic assignments are tuned such that a BEP is achieved which equals the BEP in case of an optimal traditional OFDM-based transmission (according to the optimal link adaptation described above). The dynamic OFDM allocation algorithm considered in the simulations is the optimal assignment algorithm maximizing the throughput of all stations equivalently. The same parameterization and the same methodology as in the point-to-point case described above is applied.

Figure 18:
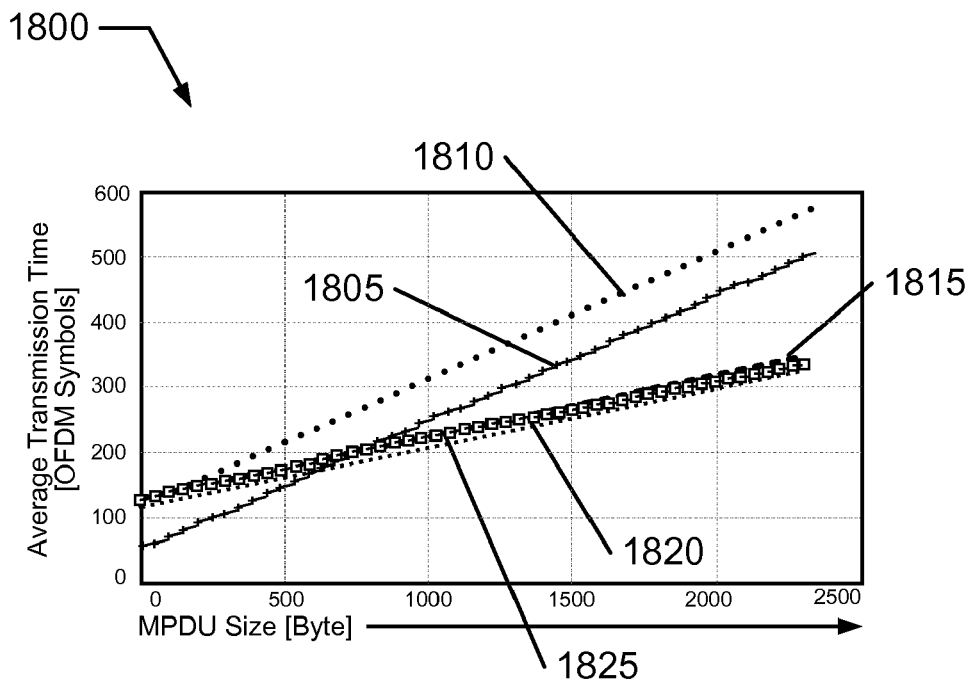
FIG. 18 illustrates the average performance results of five simulation schemes for the point-to-multipoint mode in case of two stations.

Referring now to FIG. 18, the average performance results of the five simulation schemes for the point-to-multipoint mode are described. Graph 1800 shows the performance differences for the five simulation schemes if the AP only has packets queued for two stations. Results for simulation scheme (1) are shown in curve 1805, results for simulation scheme (2) are shown in curve 1810, results for simulation scheme (3) are shown in curve 1815, results for simulation scheme (4) are shown in curve 1820, and results for the point-to-multipoint simulation scheme (5) are shown in curve 1825.

Clearly, as shown in graph 1800, the dynamic OFDM schemes outperform the traditional OFDM-based IEEE 802.11 schemes quite significantly. Compared to the traditional "sequential" transmission with an RTS/CTS handshake (shown in curve 1810), the dynamic OFDM schemes pay off at almost any MPDU size. However, the difference between the multi-user mode and a sequence of dynamic point-to-point transmissions is not very large.

It is appreciated that all four sequential schemes are simulated rather optimistically, as only a time span of a DIFS is assumed to be between two consecutive MPDU transmissions. Usually, this interval between two such transmissions is much larger, as the deferral period has to be taken into consideration as well. In addition, other stations could acquire the WM in the mean time, which would further prolong the time span between two consecutive MPDU transmissions. Therefore, in reality, even in the case of only two stations, the multi-user mode is likely to pay off more than indicated in curve 1825. If more stations are included in the multi-user transmission mode, this outperforms the sequential schemes much more, even in this rather optimistic setting.

Figure 19:
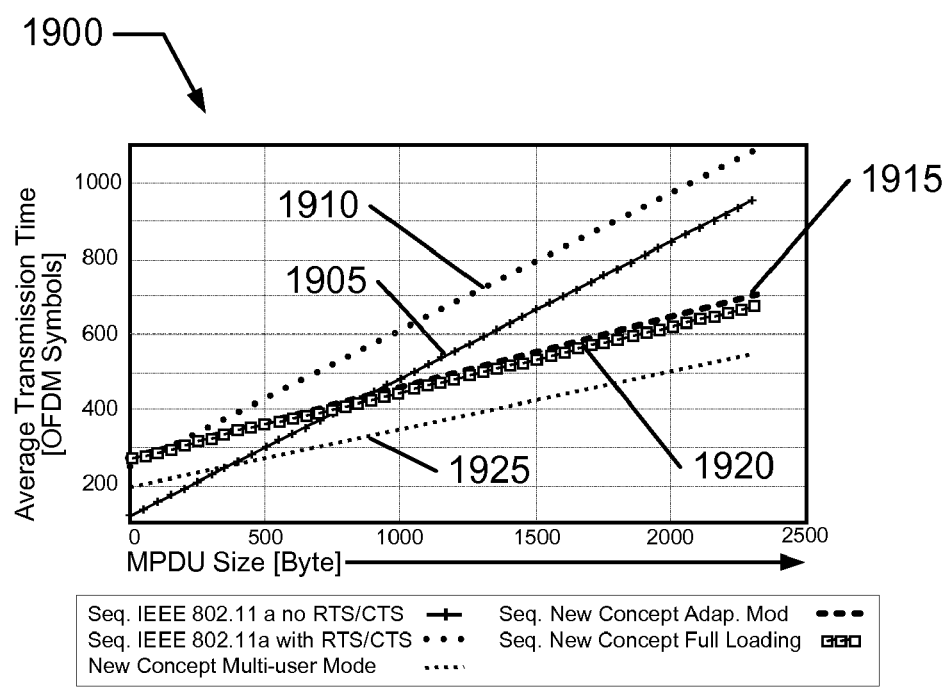
FIG. 19 illustrates the average performance results of five simulation schemes for the point-to-multipoint mode in case of four stations.

Referring now to FIG. 19, the average performance results of the five simulation schemes for the point-to-multipoint mode are described. Graph 1900 shows the performance differences for the five simulation schemes if the AP has packets queued for four stations. Results for simulation scheme (1) are shown in curve 1905, results for simulation scheme (2) are shown in curve 1910, results for simulation scheme (3) are shown in curve 1915, results for simulation scheme (4) are shown in curve 1920, and results for the point-to-multipoint simulation scheme (5) are shown in curve 1925.

In this case, the multi-user mode shown in curve 1925 outperforms the traditional scheme with an RTS/CTS handshake shown in curve 1910 already by 25% even at the smallest MPDU sizes considered. At an MPDU size of a typical IP packet (e.g., 1500 bytes), this sequential transmission is outperformed by 100%. Also, all other sequential variants shown in curves 1905, 1915, and 1920 are outperformed significantly at this MPDU size.

Figure 20:
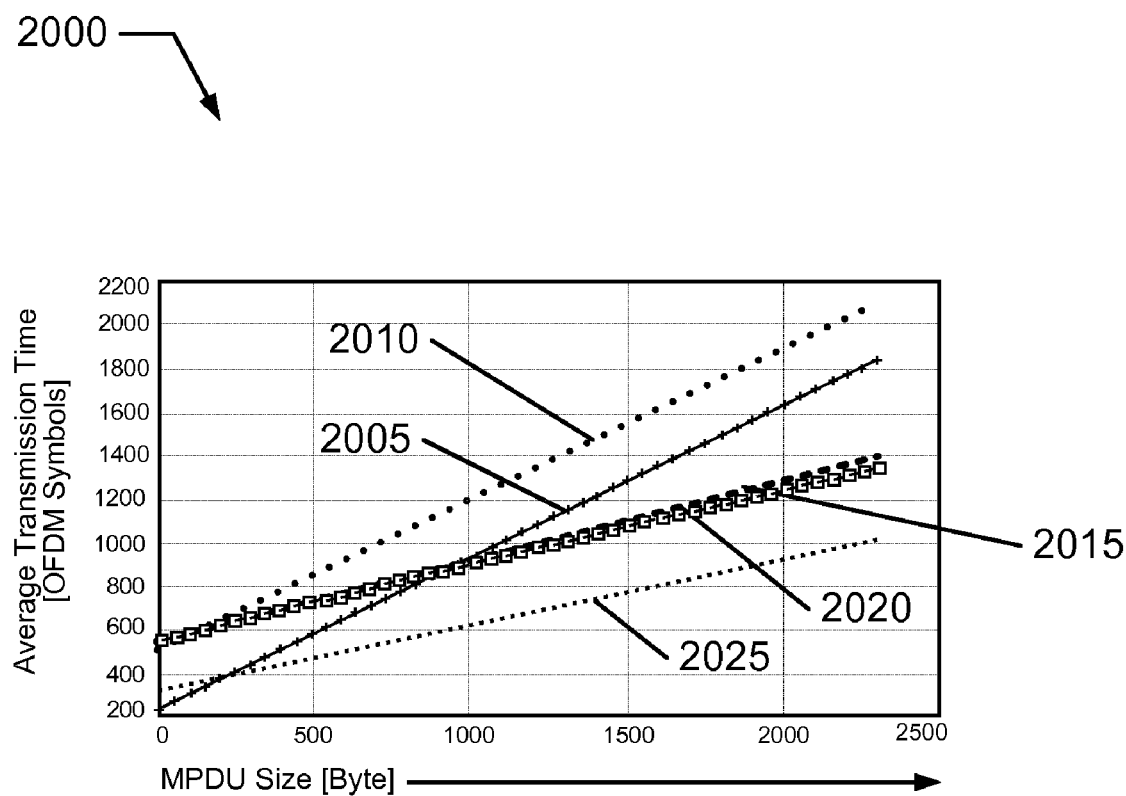
FIG. 20 illustrates the average performance results of five simulation schemes for the point-to-multipoint mode in case of eight stations.

This performance gap widens even more if eight stations are considered. FIG. 20 illustrates the average performance results of five simulation schemes for the point-to-multipoint mode for eight stations. Graph 2000 shows the performance differences for the five simulation schemes if the AP has packets queued for eight stations. Results for simulation scheme (1) are shown in curve 2005, results for simulation scheme (2) are shown in curve 2010, results for simulation scheme (3) are shown in curve 2015, results for simulation scheme (4) are shown in curve 2020, and results for the point-to-multipoint simulation scheme (5) are shown in curve 2025. The point-to-multipoint scheme depicted in curve 2025 significantly outperforms the traditional OFDM-based IEEE 802.11 schemes.

Figure 21:
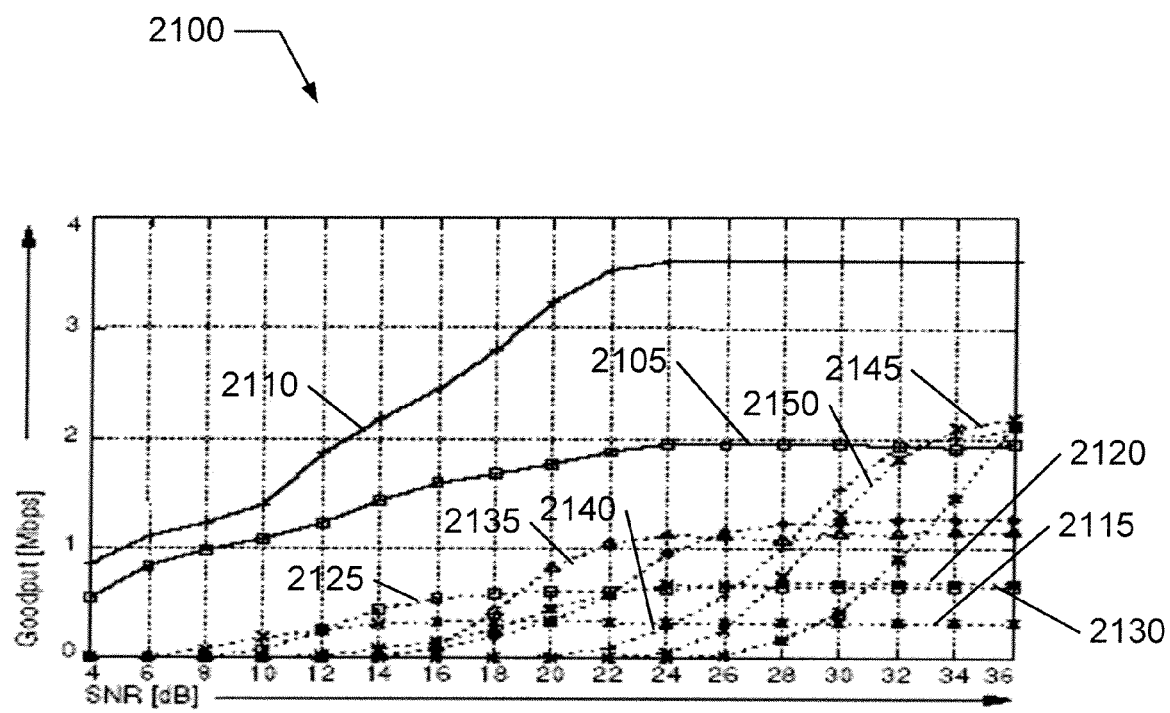
FIG. 21 illustrates the average goodput in bits per second versus the SNR for large packets for the point-to-multipoint mode.
Figure 22:
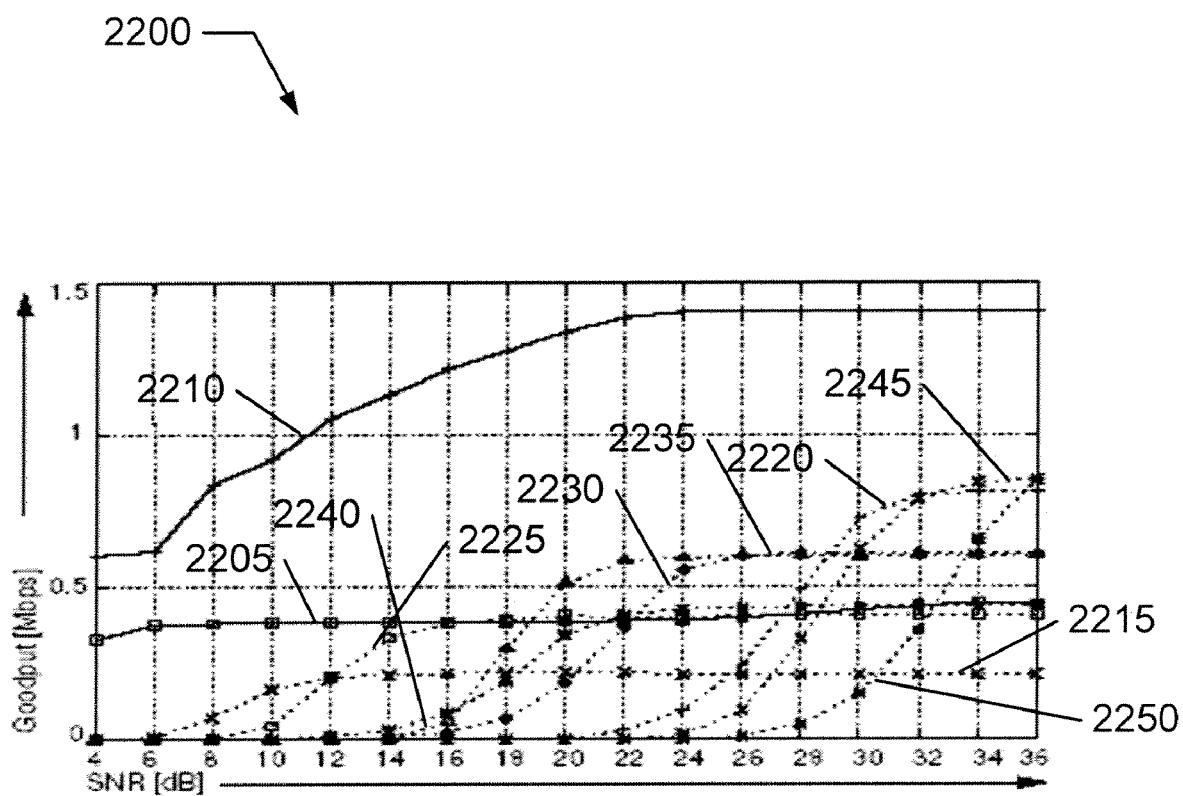
FIG. 22 illustrates the average goodput in bits per second versus the SNR for small packets for the point-to-multipoint mode.

Another performance metric that may be considered is the average goodput in bits per second at the physical link layer. Referring now to FIGS. 21-22, the average goodput in bits per second versus the SNR for large (FIG. 21) and small (FIG. 22) packets are described. The results shown in FIGS. 21-22 are generated with OPNETmodeler Version 12.0.APL-5, available from OPNET Technologies, Inc., of Bethesda, Md. Modifications of standard WLAN models and protocols required to support dynamic OFDM are performed with the OPNET model library.

In particular, the simulations performed with the traditional IEEE 802.11 protocols follow the protocols as close as possible. For example, the exponential backoff that the transmitter has to perform every time after transmitting a packet is considered in this case (i.e., if a station wants to re-access the WM immediately after finishing a packet transmission, it has to go into the exponential backoff mode as specified in the protocols). Furthermore, only long preambles are considered. Packet errors are only considered in data frames. Hence, a retransmission is always due to an incorrect payload of the data frame. The distance between the transmitter and receiver (and therefore the average SNR) is varied as well as the number of stations present.

It is appreciated that mobility is not considered for a single simulation run. Also, for a single simulation run all stations have the same distance to the AP and therefore the same average SNR due to path loss. For each simulation run, about 5000 packets are transmitted to obtain the average goodput results. The fading components of the OFDM sub-carrier channel gains are randomly generated at each payload.

It is also appreciated that for the average goodput results, the bit error probability of each sub-carrier has to be weighted by the modulation type chosen for that sub-carrier when dynamic OFDM is applied. Packet transmission and therefore the error behavior for two sequentially transmitted packets can be assumed to be statistically independent. In addition, it is assumed that the AP always holds a packet for each station in the cell. Stations do not have any data to send (only the down-link performance is simulated). Hence, no collisions occur.

Graph 2100 in FIG. 21 illustrates the average goodput in bits per second versus the SNR for large packets of 1564 bytes, corresponding to a packet size of 1536 bytes plus 28 bytes for the IEEE 802.11 MAC overhead. Graph 2200 in FIG. 22 illustrates the average goodput in bits per second versus the SNR for small packets of 228 bytes, corresponding to a packet size of 200 bytes plus 28 bytes for the IEEE 802.11 MAC overhead. Curves 2105 and 2205 show the results for a single user, point-to-multipoint mode, curves 2110 and 2210 show the results for a multi-user, point-to-multipoint mode, curves 2115 and 2215 show the results for comparison scheme (1) employing BPSK as its modulation type at a coding rate of ½, curves 2120 and 2220 show the results for comparison scheme (1) employing BPSK as its modulation type at a coding rate of ¾, curves 2125 and 2225 show the results for comparison scheme (1) employing QPSK as its modulation type at a coding rate of ½, curves 2130 and 2230 show the results for comparison scheme (1) employing QPSK as its modulation type at a coding rate of ¾, curves 2135 and 2235 show the results for comparison scheme (1) employing 16-QAM as its modulation type at a coding rate of ½, curves 2140 and 2240 show the results for comparison scheme (1) employing 16-QAM as its modulation type at a coding rate of ¾, curves 2145 and 2245 show the results for comparison scheme (1) employing 64-QAM as its modulation type at a coding rate of ½, and curves 2150 and 2250 show the results for comparison scheme (1) employing 64-QAM as its modulation type at a coding rate of ¾.

For the single-user, point-to-multipoint mode shown in curves 2105 and 2205, the stations are served one by one in a round robin fashion. The PHY applies adaptive modulation per sub-carrier, depending on the gains of the sub-carriers. Choosing any particular modulation scheme depends on the target bit error per terminal. The goodput can be optimized (for a fixed average SNR and payload packet size) by choosing the "right" target bit error probability. Accordingly, the results shown in curves 2105 and 2205 correspond to the optimal target bit error probabilities.

For the multi-user, point-to-multipoint mode shown in curves 2110 and 2210, several packets are transmitted simultaneously to different stations. Again the target bit error probability choice is very important for the goodput performance (only results for the optimal setting are shown). All stations in the system receive one packet for each multi-user burst transmission. Up to eight stations in the cell are considered. This keeps transmission times reasonably short even if large packet sizes are assumed.

It is appreciated that in this multi-user mode each station receives the same amount of sub-carriers. For example, if four stations are considered during a down-link transmission, each station receives 12 sub-carriers. Given this fixed sub-carrier allocation, a simple dynamic algorithm is employed to pick the specific sub-carriers assigned to each station. Basically, the algorithm considers one station after the other and assigns the pre-allocated number of best sub-carriers to the corresponding station from the set of remaining sub-carriers. In order to maintain fairness, the order of picking sub-carriers for stations is shifted on a per-down-link transmission basis.

As illustrated in FIGS. 21-22, for both large (FIG. 21) and small (FIG. 22) packets the multi-user, point-to-multipoint mode (2210 and 2220) significantly outperforms the traditional OFDM-based IEEE 802.11 protocols. As described above, these results assume a quite optimistic setting (no deferral period, WM is always idle) for the sequential transmission schemes. That is, the multi-user mode will pay off even more for any MPDU size in practical configurations. These results suggest that this multi-user mode is a very attractive way to enhance the capability of traditional IEEE 802.11 systems to transmit simultaneous voice-over-IP calls.

Advantageously, the present invention enables dynamic OFDM to be incorporated in traditional OFDM-based WLAN protocols while providing full backward compatibility with the protocols. Applying dynamic OFDM in WLAN communications provides significant performance gains without much additional overhead. Performance gains may be achieved even if the receiver does not support dynamic OFDM communications. For example, a point-to-point mode may be implemented by having a transmitter vary the transmit power per sub-carrier while keeping the modulation types fixed to improve the BEP performance for a traditional OFDM-based receiver.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A method performed by a wireless transmitter for implementing dynamic orthogonal frequency-division multiplexing ("OFDM") in a wireless network, the method comprising:
   acquiring information about a wireless channel, the channel for communicating between the transmitter and one or more receivers in accordance with a wireless protocol, the wireless channel comprising a plurality of sub-carriers in accordance with the OFDM scheme of the wireless protocol;
   in accordance with the acquired information, generating a dynamic OFDM allocation;
   modifying a value of a field of a header of a data frame specified by the wireless protocol to indicate that the data frame supports dynamic OFDM;

adding a new field to the header of the data frame to package the dynamic OFDM allocation for transmission to the one or more receivers; and
encoding data in the data frame in accordance with the dynamic OFDM allocation; and
transmitting the data frame according to the wireless protocol; wherein:
the acquired information comprises a gain of each sub-carrier; and
the dynamic OFDM allocation comprises at least one of a transmit power and a modulation type for each sub-carrier respectively.

2. The method of claim 1, further comprising establishing a control handshake between the transmitter and the one or more receivers.

3. The method of claim 2, wherein establishing a control handshake comprises transmitting a request to send frame to the one or more receivers and receiving one or more clear to send frames from the one or more receivers.

4. The method of claim 3, wherein acquiring information about the wireless channel comprises acquiring wireless channel state information from the one or more clear to send frames.

5. The method of claim 2, further comprising transmitting a CTS-to-self frame prior to the request to send frame to indicate support for dynamic OFDM communications over the wireless channel.

6. The method of claim 1, further comprising assigning a same transmit power to each sub-carrier.

7. The method of claim 1, further comprising assigning a same modulation type to each sub-carrier.

8. The method of claim 1, wherein encoding data comprises encoding data in the data frame to achieve a substantially equal throughput for the one or more receivers.

9. The method of claim 1, further comprising assigning different sets of OFDM sub-carriers to different receivers.

10. The method of claim 1, wherein modifying the value of the field of the header comprises introducing a signaling field in the header to indicate transmission of the dynamic OFDM allocation to the one or more receivers.

11. The method of claim 10, further comprising receiving one or more acknowledgment packets from the one or more receivers.

12. The method of claim 11, further comprising resetting a network allocation vector.

13. The method of claim 1 wherein the modulation type for each sub-carrier respectively comprises one of no modulation, BPSK modulation, QPSK modulation, 16-QAM modulation, and 64-QAM modulation.

14. The method of claim 1 wherein the transmit power for each sub-carrier respectively comprises one of a power that in combination with the bit rate maximizes a total data rate over all sub-carriers, a same power, and a power that in combination with the modulation type is less than a maximum power.

15. A computer readable storage medium, comprising executable instructions to:
establish a control handshake between a transmitter and one or more receivers communicating in accordance with a wireless protocol governing communications across a wireless channel, the wireless channel comprising a plurality of sub-carriers in accordance with a orthogonal frequency-division ("OFDM") scheme of the wireless protocol;
acquire information about the wireless channel responsive to the control handshake, the acquired information comprising a gain of each sub-carrier;
generate a dynamic OFDM allocation in accordance with the acquired information, the dynamic OFDM allocation comprising at least one of a transmit power and a modulation type for each sub-carrier respectively;
encode data in a data frame in accordance with the dynamic OFDM allocation;
modify a physical layer convergence protocol header of the data frame to include the dynamic OFDM allocation for the encoded data; and
transmit the data frame to the one or more receivers.

16. The computer readable storage medium of claim 15, wherein the wireless protocol comprises the IEEE 802.11 family of protocols.

17. The computer readable storage medium of claim 15, further comprising executable instructions to manage a network allocation vector based on the acquired information.

18. The computer readable storage medium of claim 15, wherein the dynamic OFDM allocation further comprises a coding scheme.

19. The computer readable storage medium of claim 15, wherein the modulation type is selected from a list comprising no modulation, BPSK, QPSK, 16-QAM, and 64-QAM.

20. A transmitter for transmitting dynamic orthogonal frequency-division multiplexing ("OFDM") data to one or more receivers communicating in accordance with a wireless protocol across a wireless channel, the transmitter comprising:
a module for acquiring information about the wireless channel, the wireless channel comprising a plurality of sub-carriers in accordance with the OFDM scheme of the wireless protocol, the acquired information comprising a gain of each sub-carrier;
a module for generating a dynamic OFDM allocation in accordance with the acquired information, the dynamic OFDM allocation comprising at least one of a transmit power and a modulation type for each sub-carrier respectively;
a module for encoding data in accordance with the dynamic OFDM allocation; and
a module for packaging the dynamic OFDM allocation and the encoded data in a data frame in accordance with the wireless protocol, wherein the module for packaging modifies a header of the data frame to include the dynamic OFDM allocation.

21. The transmitter of claim 20, wherein the wireless protocol comprises the IEEE 802.11 family of protocols.

22. The transmitter of claim 20, wherein the module for acquiring information about the wireless channel acquires the information based on a control handshake between the transmitter and the one or more receivers.

23. A method performed by a wireless transmitter for implementing dynamic orthogonal frequency-division multiplexing ("OFDM") in a wireless network, wherein the transmitter communicates with one or more receivers via a wireless channel in accordance with a wireless protocol, the wireless channel comprises a plurality of sub-carriers in accordance with the OFDM scheme of the wireless protocol, the receiver adapted for detecting a gain of each sub-carrier of the wireless channel, the method comprising:
in accordance with the detected gain of each sub-carrier, generating a dynamic OFDM allocation, the dynamic OFDM allocation comprising at least one of a transmit power and modulation type for each sub-carrier respectively;
modifying a header of a data frame specified by the wireless protocol to include the dynamic OFDM allocation;
encoding data in the data frame in accordance with the dynamic OFDM allocation; and transmitting the data frame according to the wireless protocol.

24. The method of claim 23 wherein generating the dynamic OFDM allocation further comprises a coding scheme for each sub-carrier.

25. The method of claim 23 further comprising assigning the same modulation type for each sub-carrier.

26. The method of claim 23 further comprising encoding data in accordance with the dynamic OFDM allocation to achieve a substantially equal throughput for the one or more receivers.

27. The method of claim 23 further comprising assigning different sets of sub-carriers to different receivers.

28. The method of claim 23 further comprising encoding data in the frame in accordance with the dynamic OFDM allocation.

29. The method of claim 23 wherein modifying the header comprises introducing a signaling field into the header to indicate dynamic OFDM allocations to the one or more receivers.

30. The method of claim 23 further comprising transmitting a CTS-to-self frame prior to a request to send frame to indicate support for dynamic OFDM communications over the wireless channel.

31. The method of claim 23 wherein the modulation type for each sub-carrier respectively comprises one of no modulation, BPSK modulation, QPSK modulation, 16-QAM modulation, and 64-QAM modulation.

32. The method of claim 23 wherein the transmit power for each sub-carrier respectively comprises one of a power that in combination with the bit rate maximizes a total data rate over all sub-carriers, a same power, and a power that in combination with the modulation type is less than a maximum power.

33. A transmitter for transmitting dynamic orthogonal frequency-division multiplexing ("OFDM") data to one or more receivers communicating in accordance with a wireless protocol across a wireless channel, the wireless channel comprising a plurality of sub-carriers in accordance with the OFDM scheme of the wireless protocol, the transmitter comprising:
  a module that generates a dynamic OFDM allocation in accordance with an information acquired about the wireless channel;
  a module that encodes data according to the dynamic OFDM allocation; and
  a module that packages the dynamic OFDM allocation and the encoded data in a data frame based on the wireless protocol, wherein the module for packaging modifies a header of the data frame to include the dynamic OFDM allocation; wherein:
    the information acquired about the wireless channel comprises a gain of each subcarrier; and
    the OFDM allocation comprises at least one of a transmit power and modulation type for each sub-carrier respectively.

34. The transmitter of claim 33 wherein the wireless protocol comprises the IEEE 802.11 family of protocols.

35. The transmitter of claim 33 wherein generating the dynamic OFDM allocation further comprises selecting a coding scheme for each sub-carrier.

36. The transmitter of claim 33 further comprising assigning the same transmit power for each sub-carrier.

37. The transmitter of claim 33 further comprising assigning the same modulation type for each sub-carrier.

38. The transmitter of claim 33 further comprising generating dynamic OFDM data to achieve a substantially equal throughput for the one or more receivers.

39. The transmitter of claim 33 further comprising assigning different sets of OFDM sub-carriers to different receivers.

40. The transmitter of claim 33 wherein modifying the header comprises introducing a signaling field in the header to provide dynamic OFDM allocations to the one or more receivers.

41. The transmitter of claim 33 further comprising transmitting a CTS-to-self frame prior to a request to send frame to indicate support for dynamic OFDM communications over the wireless channel.

42. The transmitter of claim 33 wherein the modulation type for each sub-carrier respectively comprises one of no modulation, BPSK modulation, QPSK modulation, 16-QAM modulation, and 64-QAM modulation.

43. The transmitter of claim 33 wherein the transmit power for each sub-carrier respectively comprises one of a power that in combination with the bit rate maximizes a total data rate over all sub-carriers, a same power, and a power that in combination with the modulation type is less than a maximum power.

* * * * *